United States Patent
Vyas et al.

(10) Patent No.: US 11,036,610 B2
(45) Date of Patent: Jun. 15, 2021

(54) LOGGING TECHNIQUES FOR THIRD PARTY APPLICATION DATA

(71) Applicant: Apple Inc., Cupertino, CA (US)

(72) Inventors: Amit K. Vyas, San Jose, CA (US); Abhinav Pathak, Campbell, CA (US); Anthony R. Newnam, Mountain View, CA (US); Phillip J. Azar, Oakland, CA (US); Ashish Patro, Mountain View, CA (US); Prajakta S. Karandikar, Santa Clara, CA (US); Daniel J. Etter, Mountian View, CA (US); Conor J. O'Reilly, San Jose, CA (US); Andreas C. Bergen, Cupertino, CA (US); Nehal Bhandari, Mountain View, CA (US); Jeffrey S. Lale, San Francisco, CA (US); Andrew P. Sakai, San Jose, CA (US); Terrence R. Long, San Jose, CA (US); Soren C. Spies, San Jose, CA (US)

(73) Assignee: APPLE INC., Cupertino, CA (US)

( * ) Notice: Subject to any disclaimer, the term of this patent is extended or adjusted under 35 U.S.C. 154(b) by 49 days.

(21) Appl. No.: 16/671,093

(22) Filed: Oct. 31, 2019

(65) Prior Publication Data

US 2020/0379878 A1 Dec. 3, 2020

Related U.S. Application Data

(60) Provisional application No. 62/855,288, filed on May 31, 2019.

(51) Int. Cl.
*G06F 11/34* (2006.01)
*G06F 9/54* (2006.01)
(Continued)

(52) U.S. Cl.
CPC ........... *G06F 11/3452* (2013.01); *G06F 9/54* (2013.01); *G06F 11/364* (2013.01);
(Continued)

(58) Field of Classification Search
None
See application file for complete search history.

(56) References Cited

U.S. PATENT DOCUMENTS 8,775,556 B1 * 7/2014 Matthews ............ G06F 16/958
709/217
9,842,017 B1 12/2017 Zhang et al.
(Continued)

OTHER PUBLICATIONS

International Search Report and Written Opinion issued in PCT Application No. PCT/US2020/035438, dated Sep. 18, 2020 in 12 pages.
(Continued)

*Primary Examiner* — Ryan D. Coyer
(74) *Attorney, Agent, or Firm* — Kilpatrick, Townsend and Stockton LLP

(57) ABSTRACT

Embodiments of the present disclosure present devices, methods, and computer readable medium for techniques for measuring operational performance metrics, and presenting these metrics through an application programming interface (API) for developers to access for optimizing their applications. Exemplary metrics can include central processing unit or graphics processing unit time, foreground/background time, networking bytes (per application), location activity, display average picture luminance, cellular networking condition, peak memory, number of logical writes, launch and resume time, frame rates, and hang time. Regional markers can also be used to measure specific metrics for in application tasks. The techniques provide multiple user interfaces to help developers recognize the important metrics to optimize the performance of their applications. The data can be
(Continued)

normalized over various different devices having different battery size, screen size, and processing requirements. The user interfaces can provide an intelligent method for visualizing performance changes for significant changes in application versions.

20 Claims, 18 Drawing Sheets

(51) Int. Cl.
    G06F 16/906     (2019.01)
    G06F 16/904     (2019.01)
    G06F 17/18      (2006.01)
    G06K 9/62       (2006.01)
    G06F 11/36      (2006.01)

(52) U.S. Cl.
    CPC ........ *G06F 11/3612* (2013.01); *G06F 16/904* (2019.01); *G06F 16/906* (2019.01); *G06F 17/18* (2013.01); *G06K 9/6267* (2013.01)

(56) References Cited

U.S. PATENT DOCUMENTS

| | | |
|---|---|---|
| 2012/0120078 A1 | 5/2012 | Hubbard |
| 2014/0098639 A1 | 4/2014 | Ma et al. |
| 2015/0069912 A1 | 3/2015 | Valcore et al. |
| 2015/0346797 A1 | 12/2015 | Woolf |
| 2016/0218766 A1 | 7/2016 | Valcore et al. |
| 2016/0328557 A1* | 11/2016 | Sucharitakul ......... G06F 21/552 |
| 2017/0134237 A1 | 5/2017 | Yang et al. |
| 2017/0344413 A1* | 11/2017 | Chakra ............... G06F 11/0766 |
| 2018/0373617 A1 | 12/2018 | Gaier et al. |
| 2019/0256924 A1 | 8/2019 | Vogelstein et al. |
| 2020/0090278 A1* | 3/2020 | Christensen ........... G06N 20/00 |
| 2020/0195515 A1 | 6/2020 | Yang et al. |

OTHER PUBLICATIONS

Notice of Allowance issued in U.S. Appl. No. 16/671,128, dated Jun. 29, 2020 in 9 pages.

* cited by examiner

LOGGING TECHNIQUES FOR THIRD PARTY APPLICATION DATA

CROSS-REFERENCES TO RELATED APPLICATIONS

This application claims priority to and incorporates by reference commonly-owned U.S. Patent Application Ser. No. 62/855,288, filed May 31, 2019, entitled "Third Party Application Performance Improvement Toolkit," in its entirety and for all purposes.

FIELD

The present disclosure relates generally to techniques for monitoring and measuring power, performance, and input/output (I/O) metrics for testing of beta and various commercial release versions of applications for electronic devices.

BACKGROUND

Consumers can be concerned with the power consumption, performance, and I/O metrics for applications. Electronic devices can have limited battery life, processing power, and number of writes to a solid state storage device. Measuring these metrics can be difficult for third party developers who do not possess in-depth knowledge of the operating system. Prior efforts to monitor and measure these metrics were often inaccurate, inefficient, and impacted the performance of the operating system. Often developers did not understand which key performance metrics to gather to improve performance of the application. Providing these metrics to third party developers in a usable format can result in more efficient, better performing applications resulting in overall improved consumer satisfaction with the applications.

BRIEF SUMMARY

Certain embodiments are directed to techniques (e.g., a method, a memory or non-transitory computer readable medium storing code or instructions executable by one or more processors) for measuring performance metrics, as well as providing these metrics through an application programming interface (API) for developers to access for optimizing their applications. An objective is to monitor and surface these metrics in a way that has little to no impact on performance of the application, the operating system, and the electronic device. The performance metrics can be monitored or obtained from different parts of the operating system, some in kernel space, and some in user space. The metrics can be collected for multiple devices running the application and aggregated for developer review in an integrated development environment.

These and other embodiments of the invention are described in detail below. For example, other embodiments are directed to systems, devices, and computer readable media associated with methods described herein.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

Figure 1:
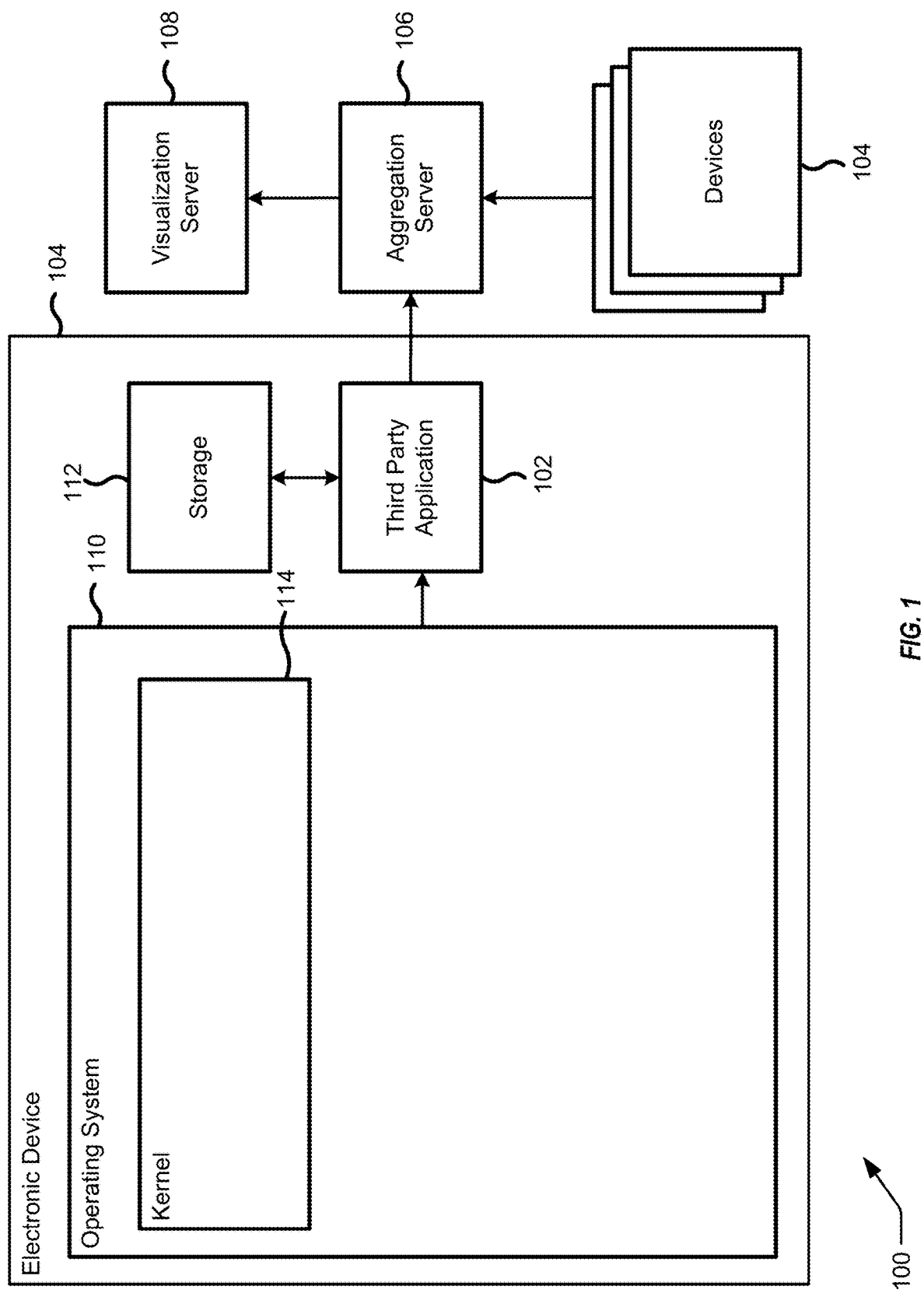
FIG. 1 illustrates a simplified, exemplary diagram of a system for collecting, aggregating, and visualizing operational metrics for evaluating third party applications.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Certain embodiments of the present disclosure relate to devices, computer-readable medium, and methods for measuring operational metrics (e.g., power and performance metrics), providing these metrics through an application programming interface (API) for developers to access for optimizing their applications. In the disclosed techniques, a processor can receive an execution trigger from a third party application informing a data logging routine to collect one or more raw data metrics. The execution trigger can be general to the application or be specific for a particular routine of the application (e.g., video streaming routine of a social media application). The techniques can control how the identifiers are used so as to customize how the operational metrics are measured. The techniques can determine which metrics to measure and provide instructions to system routines, which capture the raw data for events. As examples, the raw data for these metrics can be captured from the device kernel in the one or more processors, a logging routine of the operating system (e.g., iOS), and a hardware logging routine. The event data can be stored in a persistent storage periodically throughout the day (e.g., N time per day). Nightly, the techniques can summarize the event data, and the summarized data can be sent to an aggregation server. The aggregation server can collect operational metric data for various devices. The aggregation server can review metadata associated with the operation metrics to determine the classification and model of the electronic devices running the application. A visualization server can receive developer inputs to customize how the data displayed for analysis. For example, a developer can select the classification of device (e.g., smartphone or tablet) and the model of the device (e.g., iPhone X) in determining which operational metrics can be provided. The visualization server presents the operational metric data on a display in a manner to be easily reviewed and analyzed by the developer.

As used herein, a metric data record is raw data from an electronic device that is a measure of some operation of the device. As used herein, an operational metric is a value calculated from one or more metric data records that can be used to measure an operational condition of an application (e.g., power consumption or performance of an application). As used herein, a classification is used to describe a general description of an electronic device (e.g., a tablet or a smartphone). As used herein, a model describes a specific embodiment (e.g., an iPhone X, or iPhone 8, etc.) of an electronic device of a particular class (e.g., a smartphone). As used herein, a data structure is a collection of data values, the relationships among them, and the functions or operations that can be applied to the data. A data structure can comprise a number of clusters where each cluster comprises a segmented range of values.

I. Data Ingestion and Processing

A. Collecting and Aggregating Metric Records

The techniques disclosed herein can include a process for data ingestion and processing of raw data that can be used to calculate one or more operational metrics. The raw data for these metrics can be captured from the device kernel, a logging routine (e.g., Powerlog) of the operating system (e.g., iOS), and a hardware logging routine (e.g., Signpost).

FIG. 1 illustrates a simplified, exemplary diagram of a system 100 for collecting, aggregating, and visualizing operational metrics for evaluating third party applications 102. A third-party application 102 is a program (e.g., an application or App) created by a developer that is different from the manufacturer of the electronic device that the application runs on or the owner of the website that offers it. The third party application 102 can be loaded into a memory of the device and be executed on one or more processors of the device. A third party application 102 can present information to a user on a display of the electronic device 104.

The system 100 can include one or more electronic devices 104, an aggregation server 106 and a visualization server 108. The electronic devices 104 can include, but are not limited to, a smartphone, a tablet, a portable computer, or a wearable device. The electronic devices 104 can include various classification as well as different models of devices. The electronic device 104 can execute an operating system 110 to execute one or more instructions from a plurality of code stored in a memory 112 on the electronic device 104. An operating system (OS) 110 is a system software that manages hardware and software resources and provides common services for programs (e.g., applications). A kernel 114 is the central part of an operating system 110. The kernel 114 manages the operations of the electronic device 104 and the hardware, most notably memory and central processing unit (CPU) time. The aggregation server 106 can collect metric record data for a plurality of different electronic devices 104 and for calculation of various different operational metrics. The visualization server 108 receives aggregated operational metric data in order to display the operational metrics for evaluation of the performance of third party application 102.

Figure 2:
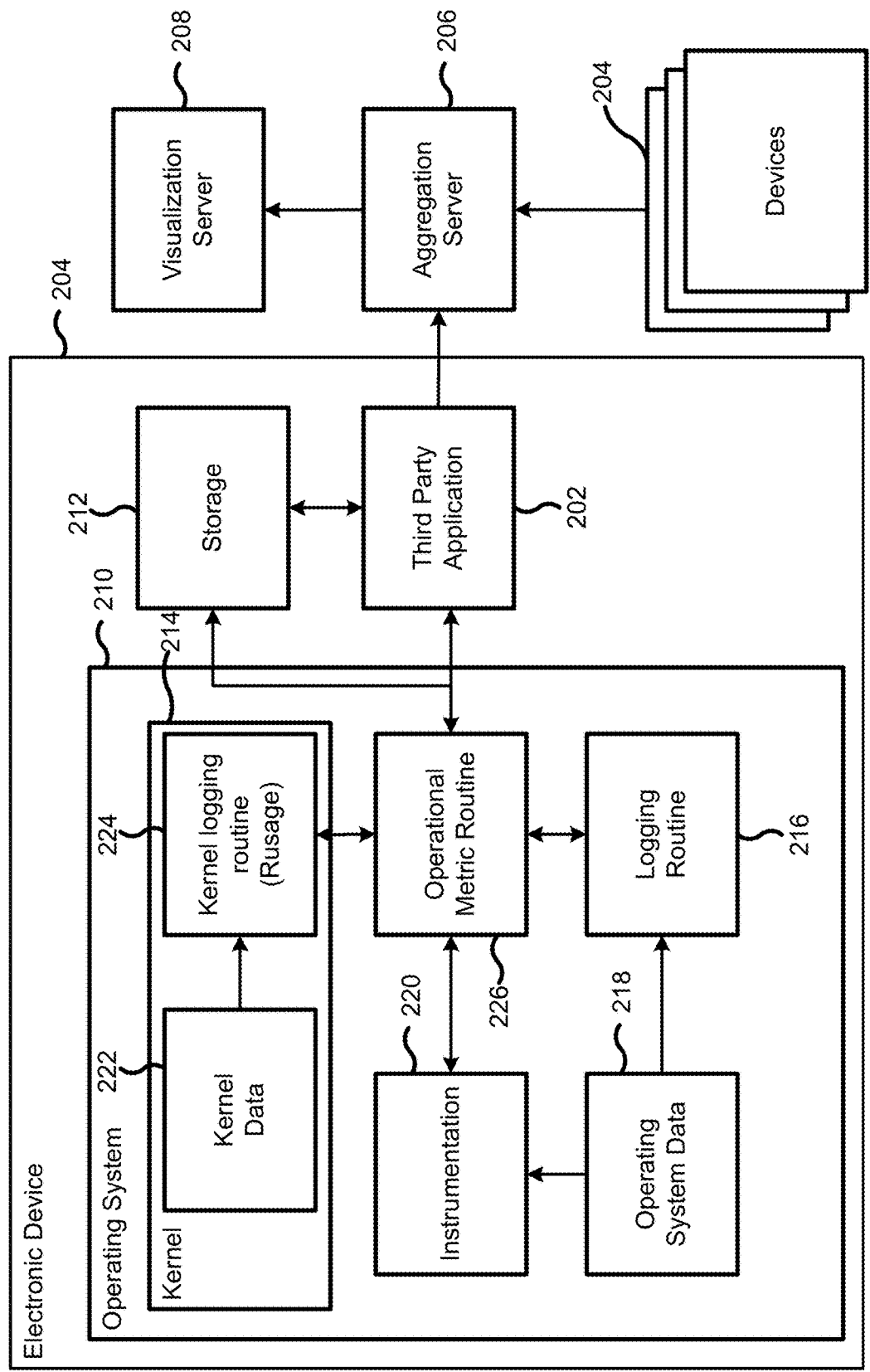
FIG. 2 illustrates an exemplary diagram of a system for collecting, aggregating, and visualizing operational metrics for evaluating third party applications.

FIG. 2 provides additional details for the system 100 described in FIG. 1. The third party application 202 can transmit an identifier to the operating system 210. The identifier can cause the operational metric routine 226 to execute a process to collect a plurality of metric records. In some embodiments, the identifier can inform the operational metric routine 226 the types of metrics that the developer desired to collect. In some embodiments, a developer can register the application 202 with the operating system developer. The application registration process can provide information on the application 202 and can inform the operational metric routine 226 of the specific operational metrics that the developer is interested in measuring.

The operating system 210 of the electronic device 204 can include various logging routines 216. In various embodiments, the logging routines can continuously capture data generated by the operating system of the device and save the data in a persistent storage (e.g., a memory). The logging routine 216 can capture operating system data 218 (e.g., foreground time, background time, networking bytes (per application), and location activity). The logging routine 216 can collect the operational data 218 and provide it to operational metric routine 226.

The logging routine 216 can collect metrics on CPU time, GPU time, CPU instructions, display average pixel luminance, cellular networking conditions, number of logical writes, and memory usage. The logging routine 216 captures snapshots for these metrics for all processes and applications running on the operating system 210 from different data sources at significant battery change (SBC) events. These events occur when there is a change in the electronic devices' battery level during the course of normal usage of the device. The logging routine 216 is configurable to allow for additional snapshotting at other important system level events. In some embodiments, once a day, the logging routine 216 summarizes these metrics per application from the previous 24 hours period (midnight to midnight) and delivers the payload to the operational metric routine 226 over a cross-process communication platform (e.g., XPC). Upon receiving this data, the operational metric routine 226 saves this data to its local persistent storage 212.

In the kernel 214, a plurality of kernel data 222 can be generated. The kernel data 222 can include CPU/graphics processing unit (GPU) time, number of logical writes to a solid state device (SSD), and memory usage. A kernel logging routine 224 can collect the kernel data 222 and provide it to the operational metric routine 226. The operational metric routine can save the kernel data in the storage 212.

As detailed earlier, the data from different sources on the operating system 210 including the kernel logging routine 224 is snapshotted by the logging routine 216 and delivered to the operational logging routine 216 once/day over a cross-process communication platform (e.g., XPC). The kernel logging routine 224 maintains various cumulative counters per process (e.g., CPU time, GPU time, CPU instructions etc.) which are continuously updated in memory during the execution of these processes.

The operating system 210 can also include instrumentation 220. The instrumentation 220 allows for selective capture of one or more operational metrics surrounding a particular event, during a discrete time period, or during execution of a particular feature of an application 202. The instrumentation 220 can log system level data (e.g., launch and resume times. Hang durations, frame rates). In addition, the instrumentation 220 can be used to set regional markers to evaluate features of the applications 202. The operating system (OS) regional markers can be used to evaluate CPU time, number of CPU instructions, current and peak memory, and logical writes.

Custom logging routine markers (e.g., MXSignposts) are built on top of operating system routine region markers (e.g., os_signpost). Custom logging routines provide a snapshot a subset of metrics for its process from the kernel logging routine 224 and store this data in the metadata field of the operational regional markers. Custom logging routines allow developers to mark critical sections of their code and collect power and performance metrics for those marked sections.

For the system level signpost data, developers internally instrument different parts of the system. For example launch times are measured by instrumenting the device operating system manager for handling foreground tasks (e.g., Frontboard) with operating system markers (e.g., os_signposts). Custom logging routine markers (e.g., MXSignposts) are distinguished by the system from the other operating system markers (e.g., os_signposts) by using the subsystem field value of os_signposts. Custom logging routine markers are tagged internally with a subsystem value unique to the customer logging routine markers.

The third party application 202 can collect the metric record data (collected from the operational metric routine 226) and save the metric record data to storage 212. In addition, the third party application can transmit the metric record data outside the electronic device 204. The metric record data can be transferred over a network (e.g., the internet). The metric record data can be aggregated with metric data from other devices in the aggregation server 206. The aggregation server 206 can decode the metric record data. A plurality of metadata accompanies the metric record data. The plurality of metadata can identify the classification of model of the device 204 from which the data originated. The aggregation server 206 can save the data to a data structure based on the value of the operation metric. The aggregation server 206 can allow for efficient analysis of the operational metrics.

The visualization server 208 receives aggregated operational metric data in order to display the data for evaluation of the performance of third party application 202.

Figure 3:
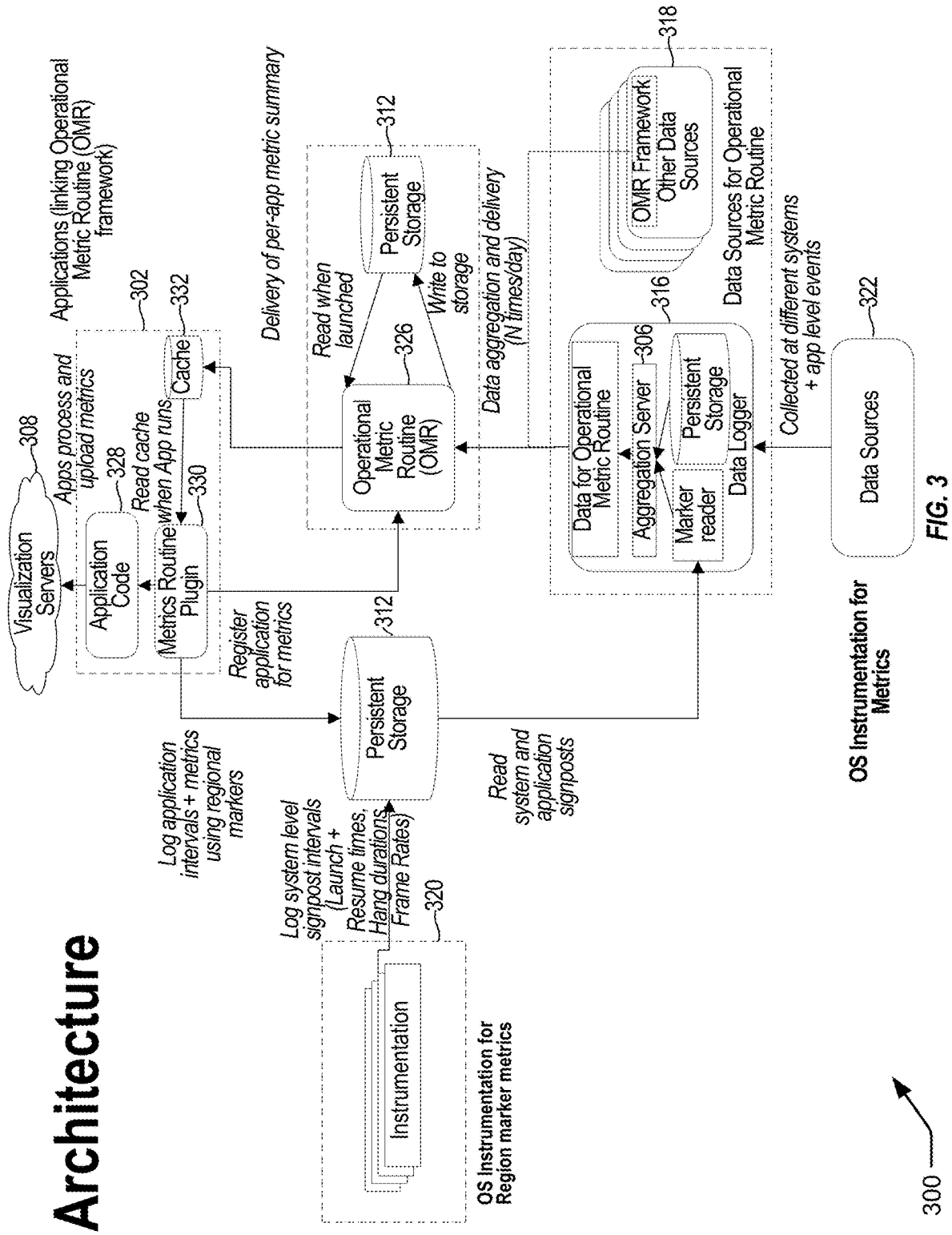
FIG. 3 illustrates an exemplary architecture for a system for a third party application performance improvement toolkit.

FIG. 3 illustrates an exemplary architecture 300 for a system for data ingestion and processing. The architecture 300 includes a toolkit application 302, an operating system that includes instrumentation routines 320, an operational metric routine 326, one or more storage devices 312, a visualization server 308, and one or more data sources 322.

The toolkit application 302 provides an interface between an operational metric routine daemon in order to process and upload operational metrics to one or more visualization servers 308. The toolkit application 302 includes application code 328 that causes the one or more processors of the electronic device to perform certain functions. The toolkit application 302 can be registered with the operating system to evaluate the operational metrics for other applications (e.g., third party applications) being executed on the electronic device. The toolkit application 302 interfaces with the operational metric routine 326 through the metrics routine plugin 330.

The metrics routine plugin 330 can register a specific monitored application. The registration process can inform the operational metric routine 326 of the specific operational metrics to measure and evaluate for monitored applications. In some embodiments, an API call from the metric plugin routine 330 can request the operational metric routine 326 to transmit the summarized metrics. In some embodiments, the summarized metrics can be stored in a cache 332 of the toolkit application 302. The cache 332 in FIG. 3 can keep the per-application metric summary until it can be delivered to the application 302. To minimize energy overhead of delivering this data to the application 302, the summary is not delivered to the application 302 until it is launched by the user. This allows the system 300 to not wake up the application 302 for the sole purpose of delivering this metric summary and thereby consume additional energy. The operational metric routine 326 can maintain a list of application bundle IDs that have been registered with the operational metric routine 326.

The operational metrics routine 326 can be a daemon routine that can launch on demand, collect data from the data logger 316, and other data sources 318, and be saved in persistent storage 312. The operational metric routine 326 reads the data saved in the persistent storage 312 and delivers a per-application metrics summary to a cache 332 for the toolkit application 302. The metric routine plugin 330 can read the cache 332 when the toolkit application 302 is running. The application code 328 can process and upload the metrics to one or more visualization servers 308 for analysis and display.

Also, once a data record is delivered to the application 302, it can be deleted from the persistent storage 312. In some embodiments, the same set of metrics are recorded for all monitored applications. In some embodiments, the toolkit application 302 can control the specific set of metrics logged for the monitored applications.

A data logger 316 can monitor one or more data sources 316 for the operational metrics registered with the operational metrics routine 326. The operational metrics can be collected at different operating system and application level events. For example, launch time can be collected during the initial execution of the application. The per-application metrics summary is an aggregate of the power and performance metrics from a predetermined period of time (e.g., a 24 hour time period). This data can be provided back to the application 302 using a data structure which contain all the metrics. The data structure also provides mechanism to export this data in other data processing formats (e.g., JSON and Dictionary). The following is an exemplary payload: {"foreground_time": 625, "background_time": 625, "cpu_time": 80, "gpu_time": 20, "average_app_apl": 58.6, "bytes": {"wifi_up": 102323, "wifi_down": 4202399, "bb_up": 23332, "bb_down": 5454,}}

The operational metric routine 326 can pull raw data from multiple different sources including an operating system logging routine 316 (e.g., Powerlog) and kernel logs (e.g., Coalitions). Other data sources are anticipated. The disclosed techniques can utilize existing logging systems and these logging systems have been implemented to run in an optimal fashion. These systems pay a performance penalty while running because they themselves utilize CPU, IO and memory resource to capture, compute and store the data to persistent storage.

The raw data 322 can be aggregated using an aggregation server 306 and delivered periodically to the operational metric routine 326. In some embodiments, the data logger 316 can deliver the data to the operational metric routine 326 multiple times per day. The system 300 also provides system markers 320 to measure operational metrics during a discrete time period (e.g., during an event between a start and end time). The instrumentation routine 320 can save a series of start and stop marker information to a persistent storage 312. The marker information can be read by a marker reader in the data logger 316.

In various embodiments, the operating system (OS) of the device can provide integrated logging systems or instrumentation that can record system level events (e.g., start up, hang time, and frame rates). The operating system instrumentation can provide operating system markers to designate the start and stop of certain events. The operating system markers can be stored in a persistent storage 312. The metrics routine plugin 330 can log application intervals and metrics using custom regional markers. For example, if a developer desires to measure the memory usage during a streaming video routine of a monitored application, custom regional markers can designate the start and end of the stream video routine. The custom regional markers information can be stored in persistent storage.

The data logger 316 can read the operating system and custom regional markers stored in the persistent storage to determine intervals for measuring certain performance metrics (e.g., launch and resume times, hand condition duration, and display frame rates.) The marker information can be sent to the aggregation server 306. The region marking is described in more detail later.

The operational metric routine 326 can receive additional data from one or more additional data sources 318 (e.g., tailspin, memory graphs, execution reports, diagnostics).

Figure 4:
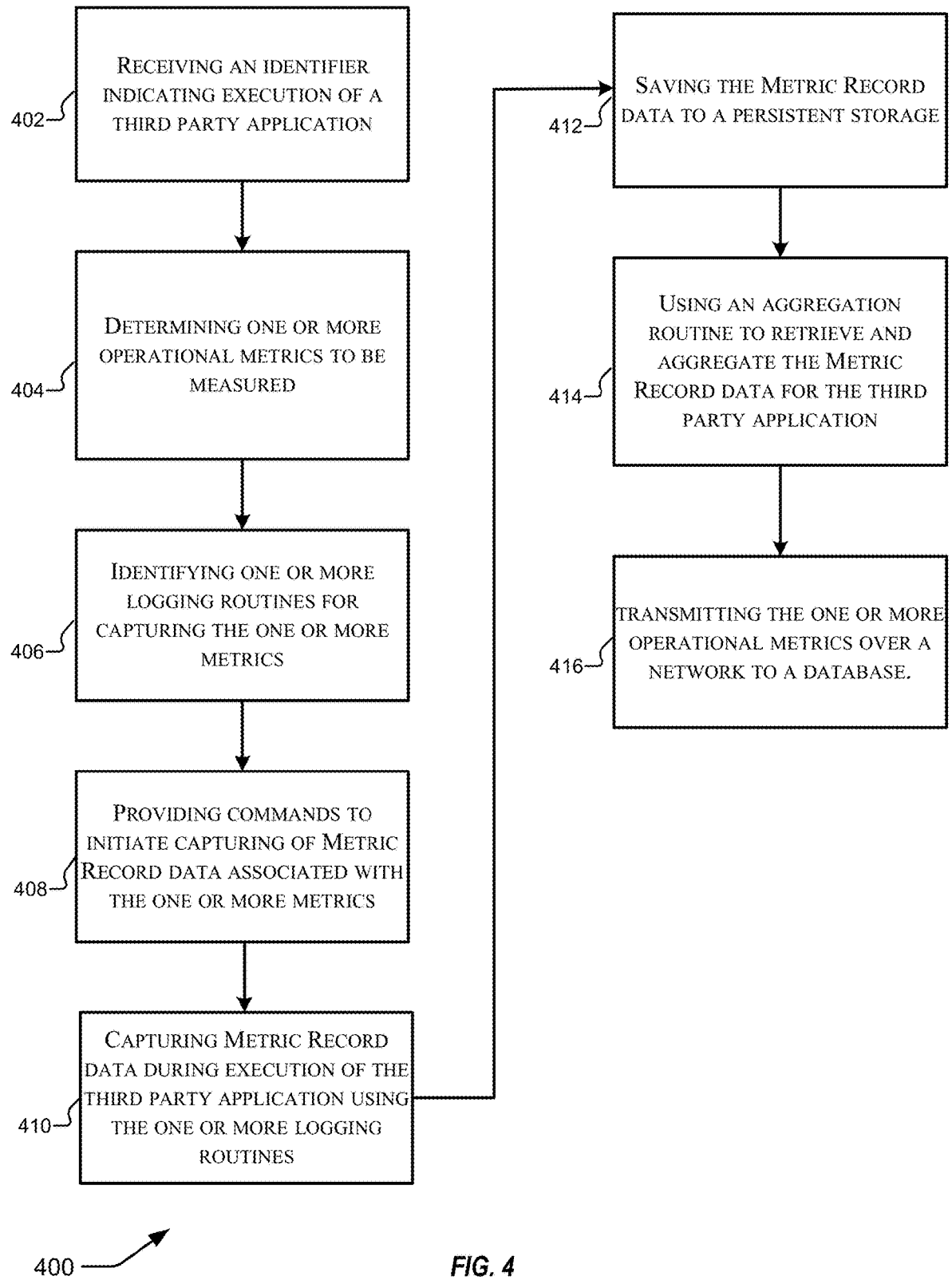
FIG. 4 illustrates a flowchart for collecting and aggregating of metric record data for the calculation of operational metrics.

FIG. 4 illustrates a flowchart 400 for a method for data ingestion and procession. At 402, the technique includes receiving an identifier indicating execution of an application on an electronic device. The application can be a third party application, meaning that the application was developed by a party different from the developer of the operating system. The electronic device can be smart phone (e.g., an iPhone), a wearable device (e.g., an iWatch), a tablet (e.g., iPad), a portable electric device or a desktop computer. The identifier can be provided by a metrics routine on the electronic device.

At 404, the technique can include determining the one or more operational metrics to be measured. The determining can be performed by the metrics routine. In some embodiments, the operational metrics can include but is not limited to: CPU/GPU time, Foreground/Background time, networking bytes per application, location activity, display average picture luminance, cellular networking conditions, peak memory, number of logical writes, launch and resume times, frame rate metrics and hangs. The metrics to be measured can be specified by a developer during registration of the application to be evaluated. The metrics that can be measured can be generic to all applications (e.g., application launch time) or can be specific to the type of application (e.g., messaging application will likely have different performance issues than a gaming application).

At 406, the technique can include identifying one or more logging routines for capturing the one or more metrics. In some embodiments, the one or more logging routines can include but are not limited to kernel instrumentation (e.g., rusage4/coalitions), operating system instrumentation, framework instrumentation (e.g., Signpost), and hardware/driver instrumentation. During registration of an application with an application performance routine, a developer can indicate the operational performance metrics she desires to monitor for performance of the application. Based on this registration, the technique can identify the one or more logging routines best suited to collect the operational performance metrics.

In some embodiments, the central processing unit (CPU) time is the desired operational metric to be measured. CPU time can be a measure of the amount of time that an application spends processing information on the CPU. For measuring the CPU time, a unix counter routine can be selected as the logging routine. The kernel logging routine can aggregate CPU time for each process on the electronic device. Further, the CPU time can be aggregated into discrete time intervals. The aggregated data can be saved in the persistent storage.

In some embodiments, the graphics processing unit (GPU) time is the desired operational metric to be measured. GPU time can be a measure of the amount of time that an application spends processing graphics information on the GPU. For measuring the GPU time, a unix counter routine can be selected as the logging routine. The kernel logging routine can aggregate GPU time for each process on the electronic device. Further, the GPU time can be aggregated into discrete time intervals. The aggregated data can be saved in the persistent storage.

In some embodiments, the cellular condition time is the desired operational metric to be measured. Cellular condition time can measure an elapsed time that the electronic device spends in one of a plurality of defined cellular conditions, wherein the cellular conditions comprise a type of network connection and network properties. For measuring the cellular condition time, a cellular monitoring routine can be selected as the logging routine. The baseband firmware of the electronic device can provide event based updates on current cellular conditions for the electronic device. A logging routine can aggregate the cellular condition time per process. The aggregated cellular condition time can be stored to a persistent storage device.

In some embodiments, the application mode time data is the desired operational metric to be measured. The application mode time can measure the elapsed time the application spends running in either the foreground or the background. For example the application can be executed in either the foreground (meaning the application user interface is presented in at least a portion of the device display) or in a background (meaning that the application user interface is not presented in any portion of the device display). A mode detection routine can detect when the application is running and measure the elapsed time while running in a foreground or a background mode. The logging routine can aggregate the mode time data (e.g., foreground or background) per application. The aggregated mode time data can be stored to a persistent storage device.

In some embodiments, the location acquisition time is the desired operational metric to be measured. Techniques to determine the precise location of the electronic device can be a driver of power consumption. The time spend acquiring a precise location and the degree of precision attained can be measured by a location acquisition routine. The location acquisition routine can measure time acquiring a location for different accuracy levels. The location acquisition time can be aggregated by accuracy levels and saved to a persistent storage device.

In some embodiments, the average pixel luminance for the display can be the desired operational metric to be measured. Pixel luminance determines the brightness of a pixel on a display. The average pixel luminance is a numerical average of the measure of the brightness of all the pixels on the display. In general, the higher the average pixel luminance the greater the power consumption. A pixel luminance detection routine can measure an average of pixel luminance for the display. The logging routine can aggregate the measured average pixel luminance by application. The aggregated data can be saved to a persistent storage device.

In some embodiments, the network transfer bytes is the desired operational metric to be measured. The number of bytes transmitted and/or received over a network device can also contribute to power consumption. In general, the higher the number of network transfer bytes, the greater the power consumption. The data transfer routine can measure the number of bytes transferred by and received by the electronic device. The logging routine can aggregate the number of bytes per application. The aggregated data can be saved to a persistent storage device.

In some embodiments, the application response time is the desired operational metric to be measured. A hangtracer routine can measure the amount of time that an application spends unresponsive to user input. The application response time can be aggregated by application and the data can be stored to a persistent storage device.

In some embodiments, the application launch time is the desired operation metric to be measured. A launch time routine can measure an elapsed time between receiving a selection of an application icon and drawing a first visible pixel on a display of the electronic device. The application launch time can be aggregated by application and saved to a persistent storage device.

In some embodiments, the application resume time is the desired operation metric to be measured. A launch time routine can measure an elapsed time between receiving a selection of an application icon and re-drawing a first visible pixel on a display of the electronic device. The application launch time can be aggregated by application and saved to a persistent storage device.

In some embodiments, the number of logical writes is the desired operational metric to be measured. Solid state storage devices have a limited number of logical writes. The greater the number of logical writes to a solid state storage device reduces the life of the flash memory of the solid state storage device. The number of logical writes can be aggregated over a discrete time period (e.g., a day). The number of logical writes can be saved to a persistent storage device.

At 408, the technique can include providing commands to initiate the capturing of metric record data associated with the one or more metrics. In some embodiments, the metrics routine can issue the commands. The duration and timeline for capturing of the metric record data can be provided by the metrics routine. The metric record data to be captured can also be identified by the metrics routine.

At 410, the technique can include capturing event data during execution of the third party application using the one or more logging routines. In some embodiments the logging routines can include a kernel logging routine, an operating system logging routine (e.g., Powerlog) and/or operating system instrumentation (e.g., Signpost).

At 412, the technique can include saving the metric record data to a persistent storage. In some embodiments, the saving can be accomplished by the logging routines. In various embodiments, the persistent storage can be the memory of the electronic device or an external storage device. In addition to the metric record data, the technique can store associated identifying metadata (e.g., data that identifies the class and model of the device generating the data). In various embodiments, the technique can also save an identification of the monitored application, the version of the monitored application, the version of the operating system of the device generating the data The metric record data can be stored in data structures. In some embodiments, the metric data records that are saved in the persistent storage can be erased after the data is transferred to a database.

At 414, the techniques can include using an aggregation routine to retrieve and aggregate the metric record data for the third party applications. For a given electronic device, multiple different applications can be monitored. In addition, multiple different features of a particular application can also be monitored and evaluated. The metric record data can store battery, performance, and disk usage information for each monitored application and monitored feature in the persistent storage. An aggregation routine can collect the metric record data for a particular application or particular feature for transmission to the database. The aggregation routine can reference stored metadata to identify the monitored application or monitored feature.

At 416, the technique can include transmitting the one or more operational metrics over a network to a database. In various embodiments, the technique can establish a wireless connection with the database through the Internet to transfer the one or more operational metrics over the wireless connection. In some embodiments, the technique can transfer the one or more metrics over a wired connection. In some embodiments, the technique can transfer the one or more operational metrics on a predetermined scheduled (e.g., hourly, daily, monthly, etc.). In some embodiments, the one or more operational metrics can be transferred on demand. In some embodiments, the technique can transfer data on an ad hoc basis. In some embodiments, all operational metrics not previously sent to the database can be transmitted during a transmission session. In various embodiments, the data may be transferred incrementally. In various embodiments, the data can be transmitted as aggregated data. In other embodiments, the data for several different monitored application can be transmitted in one session. The developer can access the one or more operational metrics transferred to the database through a developer interface.

In one aspect, a method by an electronic device comprises: receiving, at a metrics routine, an identifier to indicate execution of a third party application on the electronic device; determining, by the metrics routine, one or more operational metrics to be measured; identifying one or more logging routines for capturing one or more operational metrics, wherein a particular logging routine is identified to collect a particular metric; providing commands from the metrics routine to the one or more logging routines to initiate capturing event data associated with the one or more operational metrics; capturing, by the one or more logging routines, the event data during execution of the third party application via the one or more logging routines; saving, by the one or more logging routines, the event data to a persistent storage; upon trigger, using an aggregation routine to retrieve and aggregate the event data for the third party application to measure the one or more operational metrics; and transmitting the one or more operational metrics over a network to a database.

In various embodiments, the method further comprises: determining central processing unit time as the one or more operational metrics to be measured; identifying a unix counter routine to collect central processing unit time, wherein a kernel aggregates central processing unit time for each process executing on the electronic device; aggregating by a logging routine the central processing unit time into discrete time intervals; and saving the aggregated central processing unit time to the persistent storage.

In various embodiments, the method further comprises: determining graphics processing unit time as the one or more operational metrics to be measured; identifying a unix counter routine to collect graphics processing unit time, wherein a kernel aggregates graphics processing unit time for each process executing on the electronic device; aggregating by a logging routine the graphics processing unit time into discrete time intervals; and saving the aggregated graphics processing unit time to the persistent storage.

In various embodiments, the method further comprises: determining cellular condition time as the one or more operational metrics to be measured, wherein the cellular condition time measures an elapsed time that the electronic device spends in one of a plurality of defined cellular conditions, wherein the defined cellular conditions comprise a type of network connection and network properties; identifying a cellular monitoring routine, wherein baseband firmware provides event based updates on current cellular condition for the electronic device; aggregating by a logging routine the cellular condition time per process; and saving the aggregated cellular condition time to the persistent storage.

In various embodiments, the method comprises: determining an application mode time as the one or more operational metrics to be measured; identifying an application mode detection routine, wherein the application mode detection routine detects whether the third party application is running in a foreground or in a background; aggregating by a logging routine the application mode time per application; and saving the aggregated application mode time to the persistent storage.

In various embodiments, the method further comprises: determining location acquisition time as the one or more operational metrics to be measured; identifying a location acquisition routine, wherein the location acquisition routine measures time acquiring location for different accuracy levels; aggregating by a logging routine an elapsed time acquiring location by accuracy levels; and saving the aggregated location acquisition time to the persistent storage.

In various embodiments, the method further comprises: determining average pixel luminance as the one or more operational metrics to be measured; identifying an pixel luminance detection routine, wherein the pixel luminance detection routine measures an average of pixel luminance for a display of the electronic device; aggregating by a logging routine the average pixel luminance by application; and saving the aggregated average pixel luminance to the persistent storage.

In various embodiments, the method further comprises: determining network transfer bytes as the one or more operational metrics to be measured; identifying a data transfer routine, wherein the data transfer routine measures data transfer over a network; aggregating by a logging routine the network transfer bytes by application; and saving the aggregated network transfer bytes to the persistent storage.

In various embodiments, the method further comprises: determining memory consumption data as the one or more operational metrics to be measured; identifying a memory usage routine, wherein the memory usage routine measures peak and average memory consumption by the third party application; aggregating by a logging routine the memory consumption data by application; and saving the memory consumption data to the persistent storage.

In various embodiments, the method further comprises: determining application response time as the one or more operational metrics to be measured; identifying a hangtracer routine to measure minutes of unresponsive time of the third party application; aggregating by a logging routine the application response time by application; and saving the aggregated application response time to the persistent storage.

In various embodiments, the method further comprises: determining application launch time as the one or more operational metrics to be measured; identifying a launch time routine, wherein the launch time routine measures an elapsed time between receiving a selection of an application icon and drawing a first visible pixel on a display of the electronic device; aggregating by a logging routine application launch time by application; and saving the application launch time to the persistent storage.

In various embodiments, the method further comprises: determining a number of logical writes as the one or more operational metrics to be measured; identifying storage monitoring routine, wherein the storage monitoring routine measures the number of logical writes of a storage device of the electronic device; aggregating by a logging routine application the number of logical writes into discrete time intervals; and saving the number of logical writes to the persistent storage.

In various embodiments, the method further comprises: executing an application programming interface on the electronic device, the application programming interface provides for a customized interval for the one or more logging routines; saving a start marker and an end marker in a log storage on the electronic device; and capturing one or more operational metrics between the start marker and the end marker.

In another aspect, a computing device, comprising: one or more memories; and one or more processors in communication with the one or more memories and configured to execute instructions stored in the one or more memories to performing operations of various embodiments described above.

In another aspect, a computer-readable medium storing a plurality of instructions that, when executed by one or more processors of a computing device, cause the one or more processors to perform operations of various embodiments described above.

It should be appreciated that the specific steps illustrated in FIG. 4 provide particular techniques for capturing and aggregating operational metrics for a third party application according to various embodiments of the present disclosure. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

B. Regional Markers to Evaluate Features

In some embodiments, the techniques allow for the placement of region markers to measure performance for certain application features (e.g., a streaming feature). A signpost is a log entry that is a very lightweight form of logging. It is an event that can be marked with some metadata and some additional information like a name and a category. A purpose of signpost is to denote user interface level actions for users or a start/stop type of interval system. A custom logging routine with custom markers (e.g., MXSignpost) can be built on top of the logging routine (e.g., OSSignpost) because in addition to the start/stop functionality and being lightweight it gathers the extra kernel information. The extra kernel information can be the RUsage information including the CPU information and logical writes that can be captured between the start and endpoint of a signpost for the marker system.

The launch and resume time metrics can also be obtained from signposts. Within the user interface framework on the electronic device, user interface application. The techniques can drop signposts on launch events and resume events into the signpost stream, and the system daemon (e.g., XPC service) can read the metrics and aggregates them per application.

Figure 5:
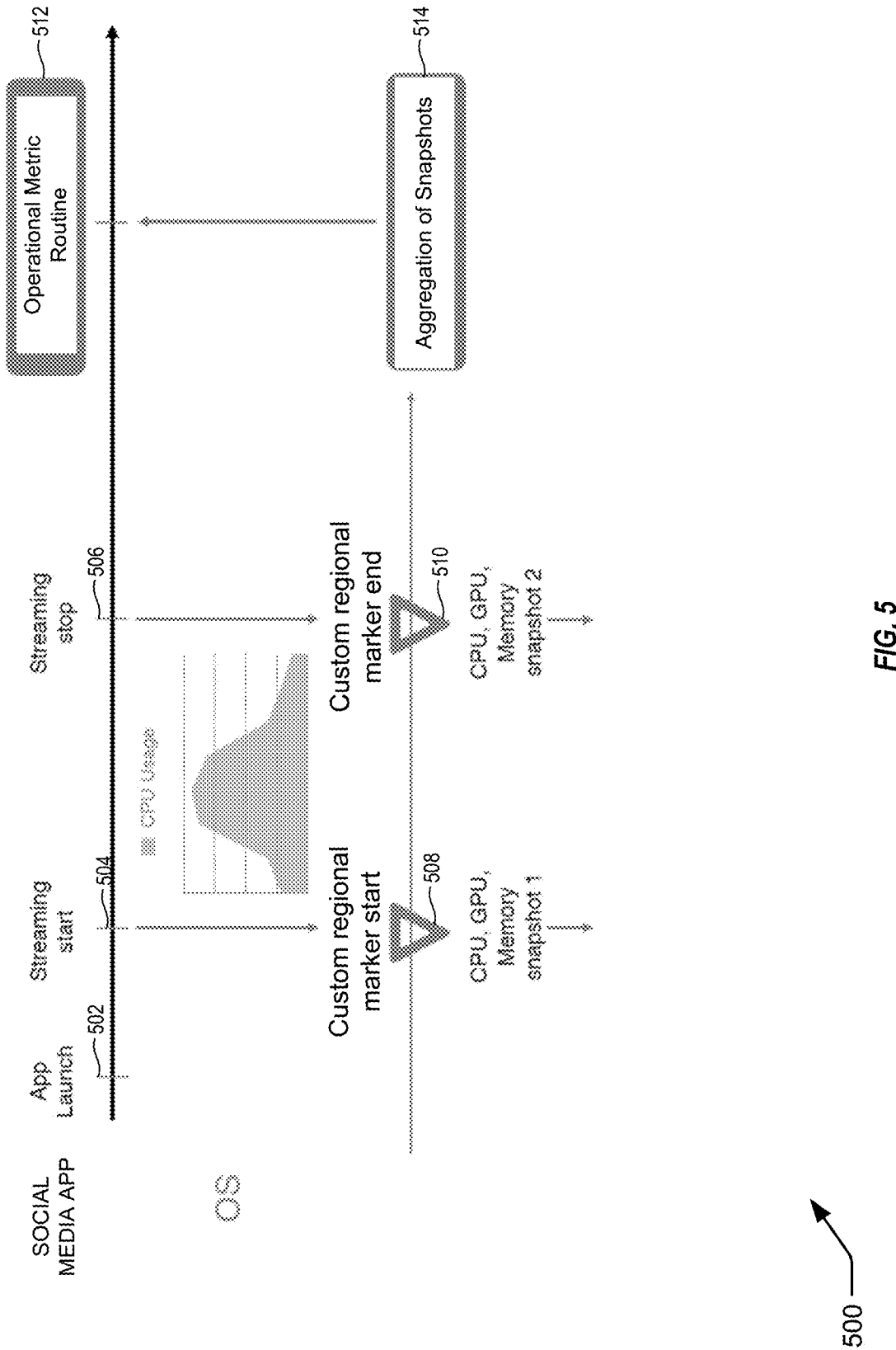
FIG. 5 illustrates an exemplary diagram of regional marking techniques.

FIG. 5 illustrates an exemplary sequence 500 for region marker architecture. In some embodiments, developers would like to evaluate operational metrics for a particular feature of an application. For example, a social media application may include a streaming media feature as part of the application. The feature may not always run on the application, therefore a developer may want to measure the operational metrics (e.g., power and performance metrics) for the application during the operation of the feature. Regional markers can be used to note the start and end of the feature so one or more snapshot can be taken to evaluate the performance metrics for this feature.

The application launch 502 can be noted to inform the operational metric routine to watch for the execution of one or more features (e.g., streaming service). For example, the social media application has been launched but at this point the streaming media feature has not yet been executed. Therefore, the tailored metrics for the CPU usage is not being collected at this point.

Upon start 504 of the streaming feature, the technique can execute a start custom regional marker 508 noting the starting time of the feature in the data stream. At this point, a snapshot can be taken to capture the CPU state, the GPU state, and the memory state just prior to execution of the streaming media feature. In this way the technique can capture the effects of starting the streaming media feature on this operational metrics.

After the streaming stop 506, the technique can execute an end custom regional marker 510 in the data stream. Metric record data (e.g., CPU, GPU, or memory information) can be collected between the start custom regional marker 508 and the end custom regional marker 510. The technique can collect an aggregation 514 of one or more custom regional interval snapshots and send this information to the operation metric routine 512. Although only two snapshots are depicted in FIG. 5, multiple snapshots can be captured between the start and end custom regional markers. These snapshots can provide information on the change of the state of the operational metrics as the specific feature is being executed.

This logging can be implemented using operational system markers (e.g., os_signposts). Operational system markers have a subsystem and category field to indicate the type of operational system data. All operational system markers can be stored in an operational system log (e.g., os_log), which is a system level logging system. To identify specific types of markers, the instrumentation filters can label operational system markers using the relevant subsystem and category values.

In some embodiments, a plurality of regional markers can be used to note the start and end time of a particular feature. For example, an application can have multiple features that may only be discretely executed. These features may have significant effects on battery or performance. It may be useful to designate the start time for executing these features and the end time for executing these features to evaluate the effect of the feature on operational metrics. Also, different regional markers can be used to note the start end time of different features for the same or different applications.

Various metrics can be measured between the start and stop markers. For example, CPU time can be measured for an application feature that occurs between the start and stop markers. The CPU time data can be provided by the kernel. As another example, the number of the CPU instructions can be measured for an application feature that occurs between the start and stop markers. The CPU instructions can be provided by the kernel. As another example, the current and peak memory can be measured for a feature of the application that occurs between the start and stop markers. The current and peak memory data can be provided by the kernel. As another example, the number of the logical writes to a solid state device can be measured for an application feature that occurs between the start and stop markers. The logical writes can be provided by the kernel.

II. Operating System Instrumentation of Operational Metrics

The operational metrics can be categorized into two categories: power metrics and performance metrics. The power metrics capture raw data and calculate the power requirements for particular aspects of an application. Excessive power consumption can be a source of customer dissatisfaction and often developers are concerned with monitoring and to the extent possible minimizing power consumption for an application. The power consumption metrics can include: central processing unit (CPU)/graphics processing unit (GPU) time, foreground and background processing time, networking bytes (per application), location activity, display average picture luminance, and cellular networking conditions.

The operational metrics can include one or more performance metrics. The performance metrics can be used to measure application performance, particularly those that consumers are concerned with. The performance metrics can include: peak memory, logical writes to a solid state device, launch and resume times, frame rate metrics, and application hang time.

The techniques can also evaluate features (e.g., streaming) for third party applications. By using region markers, the techniques can evaluate metrics such as CPU time, a number of CPU instructions, current and peak memory usage, and number of logical writes to solid state device for the marked region of the application.

A. Power Metrics

1. Central Processing Unit/Graphics Processing Unit Time

Central Processing Unit (CPU) time for an application is the amount of time that an application spends processing and using the application processor. CPU time includes any process for executing code to process any data, etc. Graphics Processing Unit (GPU) time is an amount of time that the application spends doing graphical processing using the GPU. Both CPUs and GPUs can be heavy energy consumers on electronic devices.

The raw data for CPU/GPU time can be from the kernel by unix counters attributing hardware usage to populate these metrics. The kernel can aggregate these for each process on the system. The logging routine can aggregate CPU/GPU time in distinct time intervals (e.g., 5 minute intervals) and save the aggregated information to persistent storage. The techniques can provide the aggregated time for each process.

RUsage/Coalitions data can be computed in the kernel and aggregated in userspace. One or more unix counters can attribute hardware usage time to populate this data. The kernel can aggregate these for each process in the system. A logging routine can aggregate in discrete (e.g., 5-30 minute) time intervals and commit the aggregated data to persistent storage. The techniques can deliver aggregated times for each process of the application. The kernel in its standard operating procedure will aggregate these for every process on the system as they run just continuously. In some embodiments RUsage/Coalitions can provide data for CPU time, GPU time, CPU instructions, current and peak memory, and logical writes.

2. Foreground/Background Time

Foreground and background time are actually states in which an application is running on the system. Multimedia device applications (e.g., iOS) support multitasking. Multitasking enables multiple application to run in the foreground where the application is actually onscreen and a user can see them and interact with them. Applications can also run in the background where the user does not necessarily interact with them but the application is working on things, perhaps doing maintenance activities or updating their user interface (UI) or something for a later time. Foreground and Background time can be effective measures to determine the overall energy consumption of the application. Energy consumption in the foreground can be quite different for applications running in the foreground than for applications running in the background.

In addition to the total amount of energy consumption, the percentage of energy consumption for each state of the application can be useful. For example, users have different expectations for energy usage for an application in running in a foreground as opposed to an application running in the background. So if a user is not using a social media application and the application is draining five percent every hour, users would be dissatisfied with the amount of energy consumption. However, the same energy drain while using the application would appear to be very reasonable. So the ability for developers to understand energy consumption when running in the foreground (i.e., on screen) and when it is running in the background can be very useful for them to be able to optimize their applications better.

The operating system can provide data on time in different application running modes (e.g., foreground time and background time). A logging routine can aggregate data per event and accumulate totals per application. The technique can deliver cumulative time in each running mode.

3. Networking Bytes (Per Application)

Networking bytes is the actual amount of networking upload and download consumed over cellular and Wi-Fi technologies. The baseband chip in the cellular case and the Wi-Fi chip can be heavy consumers of energy when the application is actively uploading or downloading data. Therefore, measuring the amount of bytes that the application has uploaded and downloaded can be really useful in trying to understand the overall network health of your application. Network information can be used to optimize use for cellular (e.g., attempting to limit cellular data transfer or deferring tasks) until Wi-Fi is available.

The networking bytes can be measured per channel. Therefore, cellular usage would be measured separately from Wi-Fi usage. In some embodiments, the metrics can further segregate uploading data transfer from downloading data transfer. If the same chip is used, Bluetooth communications can be counted with Wi-Fi usage. In some embodiments, Bluetooth data transfer can be separately monitored and measured.

4. Location Activity

Location activity is the amount of time that your application spends acquiring the device's location. This metric can be run mode agnostic. The metric measures how much time an application is searching for the device's geographic position. The accuracy of the of geographic position can also be determined because it can have a direct impact on the energy consumed and also the amount of time the application spends to complete.

In some embodiments, the actual usage of the location framework on the operating system can be measured (e.g., the number of geofences set). Geofencing is a location-based service in which an app or other software uses GPS, RFID, Wi-Fi or cellular data to trigger a pre-programmed action when a mobile device or RFID tag enters or exits a virtual boundary set up around a geographical location, known as a geofence. These metrics also have an impact on the overall energy consumption of the application. For example, an application may have thousands of fences, which might end up waking up your application over and over again for no reason increasing power usage.

Location activity metrics can also be differentiated between foreground and background modes. This would allow for determining the energy for an application like Google Maps or Waze to understand how much is their rate of drain is while navigating (e.g., while driving) as compared with how much is their rate of drain otherwise is when the application is using location for other features.

The information for location activity can be received from the operating system instrumentation. This time can be segregated for different accuracies. A location framework routine can provide event based data on accuracy usage. The location framework routine can send sessions to the logging routine per process. The logging routine can aggregate this data from all sessions per accuracy per process. The techniques can deliver cumulative time spent in each accuracy clusters.

5. Display Average Picture Luminance (APL)

On Organic Light Emitting Displays (OLED) displays, average picture luminance is extremely important in understanding how an applications user interface (UI) is impacting the energy consumption. Average Picture Luminance (APL) represents percentage of OLED pixels lit up. The operating system interface through an APL routine can collect data to indicate the average of the current pixel luminance. The logging routine intersects this data with collected application foreground data to determine daily averages. The techniques can deliver time limited (e.g., daily) averages for the application.

Hardware and driver instrumentation can provide the display APL data metrics.

6. Cellular Networking Conditions

Cellular networking conditions can be a large energy consumer for electronic devices. In general, the weaker the signal strength, the more energy is required to transfer data. Conversely, the stronger the signal strength, the less energy required to transfer data. Therefore understanding the signal strength is helpful for a developer to understand the cellular conditions under which the data was transferred to understand power consumption for an application. In addition to signal strength, network congestion can also be an issue with cellular communications. For example, the first hop signal can be congested while the remaining network is uncongested. In some embodiments, the device can receive information from the cellular tower itself, (e.g., latency, status, and health). If the network is overloaded, the network can be slowing down and providing less slots to transmit data. In additional, the type of network connection can also be captured (e.g., 3G, 4G (LTE), 5G, etc.)

The cellular network condition statistics can be provided to the logging routing by the baseband firmware. Baseband firmware provides event based updates on current cellular connectivity conditions. The logging routine can aggregate and store the cellular network condition data per process for the application. The techniques can deliver a histogram of application time spent in different connectivity clusters.

Hardware and driver instrumentation can provide the cellular networking conditions data.

B. Performance Metrics

1. Peak Memory

Peak memory is a metric that can be measured to determine the performance of an application. The peak memory metric can determine how the application is consuming memory. If the peak memory is very high, there are higher chances for the application to experience unexpected jetsam events when the application is running a certain mode or basically resource exceptions; so your memory is too high and the system needs to reclaim that memory in order to provide a better user experience. Jetsam is a system process that monitors memory usage on an electronic device. Jetsam triggers an event when the device encounters low memory, and will reclaim memory from other apps to improve performance of whatever is running in the foreground. It will also force close any app that does not voluntarily offer up its memory.

There are two symptoms of high-memory usage. The first symptom is that the foreground application will just disappear. It will look like a crash to the user if the memory usage exceeds an extremely high threshold. The second symptom, which can be less obvious to people but a significant problem, is that if the application uses more memory when the application is not open, then there is a higher chance that that application will no longer be kept in memory, and so when a user attempts to launch the application again, it will take much longer to open. Normally when a user launches an application on an electronic device, it is all already running on the device if a user has recently opened it so the launch will appear to be very quick to the user. This type of "launch" can be considered a resume versus a launch where the electronic device will have to fully launch the application.

There can also be a significant power implication to having high memory usage because operating systems have memory management systems that are living either in the kernel or in the OS somewhere that actually need to consume CPU in order to manage the actual physical pages and virtual pages in memory. Therefore, if an application is consuming a lot of memory in sort of wanton fashion, the application would also be consuming a lot of energy because the virtual memory manager would have to be spinning a lot of CPU into various threads to be able to manage compressing memory where it is not needed to be able to free that memory and provide it back to the application. So this also has a lot of implications for power usage.

The peak memory data can be provided by kernel instrumentation (e.g., rusage4).

2. Logical Writes

A solid-state drive (SSD) is a storage device that uses integrated circuit assemblies as memory or interconnected flash memories to store data persistently even without power. Unlike a hard disk drive or HDD that uses rotating metal platters or disks with magnetic coating to store data, an SSD has no mechanical or movable parts. One disadvantage of SSDs is the shorter lifespan than hard disk drives because SSDs have a limited write cycle. The flash memories of a solid-state drive can only be used for a finite number of writes. An SSD cannot write a single bit of information without first erasing and then rewriting very large blocks of data at one time. As each cell goes through this cycle, it becomes more useless. However, this decaying process does not affect the read capability of the entire SSD.

Many electronic devices (e.g., smartphones, tablets) utilize SSDs. Therefore, it can be important for applications to monitor and understand the number of logical writes an application running on the electronic device performs. The techniques can calculate and aggregate the amount of logical writes that an application performs on the file system. Whenever an application decides to write a file or decides to sync any defaults or anything like that, it incurs an impact on the file system on device. In some embodiments, the number of logical writes can be captured in the kernel (i.e., r_usagev4) and aggregated within the r usage ledger. This metric can help a developer understand how much duress the application is imparting on the file system and the flash memory of the SSD. Therefore, logical writes is a high level metric. This metric does not necessarily represent the physical writes to the disc, but it is one of the best metrics the developer can use to understand their write performance.

The number of logical writes can be provided by kernel instrumentation (e.g., rusage4).

3. Launch and Resume Time

Launch and resume time is another set of metrics that can be useful for developers. The slower the launch or resume time, the less desirable the application will be for consumers. Application launch time can be measured using a logging routine running in the OS. Launch time can be measured from the icon selection until the first visible draw on the display of the electronic device. Resume time can be measured from the time between the icon selection and the application redrawing on the display of the electronic device.

4. Frame Rates Metrics

Frame rate is the measure of the frequency at which frames in a screen graphics generation sequence are displayed. Effectively it is a measure of how smooth the graphics display appears. In some embodiments, the frame rate can be 60 frames per second. In other embodiments, the frame rate can be 30 frames per second. In still other embodiments, the frame rate can be 15 frames per second. Dropped frame count can also be measured. Dropped frame rate measures the number of frames that are dropped on average while performing an operation (e.g., scrolling on a display).

The operating system can provide built in features that are used by third party applications. One such feature can be scrolling the display for applications. Frame rate data can be provided by logging routines.

5. Hang Time

Hang time is a measure of the amount of time applications spend unresponsive to user input. In some embodiments, the hang time can be measured from a hangtracer routine on enabled devices. When enabled, hangtracer routine uses thread watchdogs to detect the main thread of applications being blocked. After a sufficient period of time blocked, the hangtracer routine can generate an operating system marker (e.g., os_signpost) for the event. An operating system daemon (e.g., XPC service) can collect the hang time information from the markers. The logging routine can collect and aggregate these markers per process.

III. Metrics Aggregation

Collecting the metrics in an efficient way that is usable by the developer to identify power or performance deficiencies for the application, realize changes between different versions of the application, and recommend actions to improve the performance of the application. Normalization of the metrics accounts for differences between memory, processing capabilities, screen size and battery storage capacities between devices. A centroid-based approach segments the performance metrics into various clusters to account for different devices, different versions of the application and various operating systems. Using the centroid-based approach allows for efficient analysis for large quantities of data.

One technique for performing the percentiles calculation is to take all the data for last 100 days, run an algorithm, sort the data, and then calculate the percentile value. However, the disclosed method utilizes a centroid based approach, in which the system creates multiple clusters. In each cluster the system will map the data records to a cluster of the multiple clusters as new value are generated. The system decides which cluster the new operational metric belongs, create an average mean over time, and then calculates an average for the cluster within a desired percentile class.

The clusters are continuously being rebuilt because as the system is getting new values, it will have to figure out which cluster this value belongs to, and then if a cluster becomes too large, the system will generate a new cluster. The operational data and clusters are continuously being updated. The technique uses a windowing function. Every discrete time period (e.g., 15 minutes), the system will have a set number of logs. The system will process these logs in a streaming fashion. Then, the system will save the logs to a persistent storage. When the system is storing the data to the persistent storage, the system is also calculating for a particular application, the desired cluster for several other metrics. Based on the new data received over the next discrete time period (e.g., 15 minutes), the system will determine where the current clusters were and update the current clusters. This update process minimizes the motion within the data. This technique enables better memory usage with defined clusters and corresponding averages. Therefore this technique provides is a new memory efficient usage of being able to perform analysis on the streaming data. This variable approach allows developers to analyze different centroids (e.g., for all iPhone devices, for a particular new device or for a particular operating system).

Figure 6:
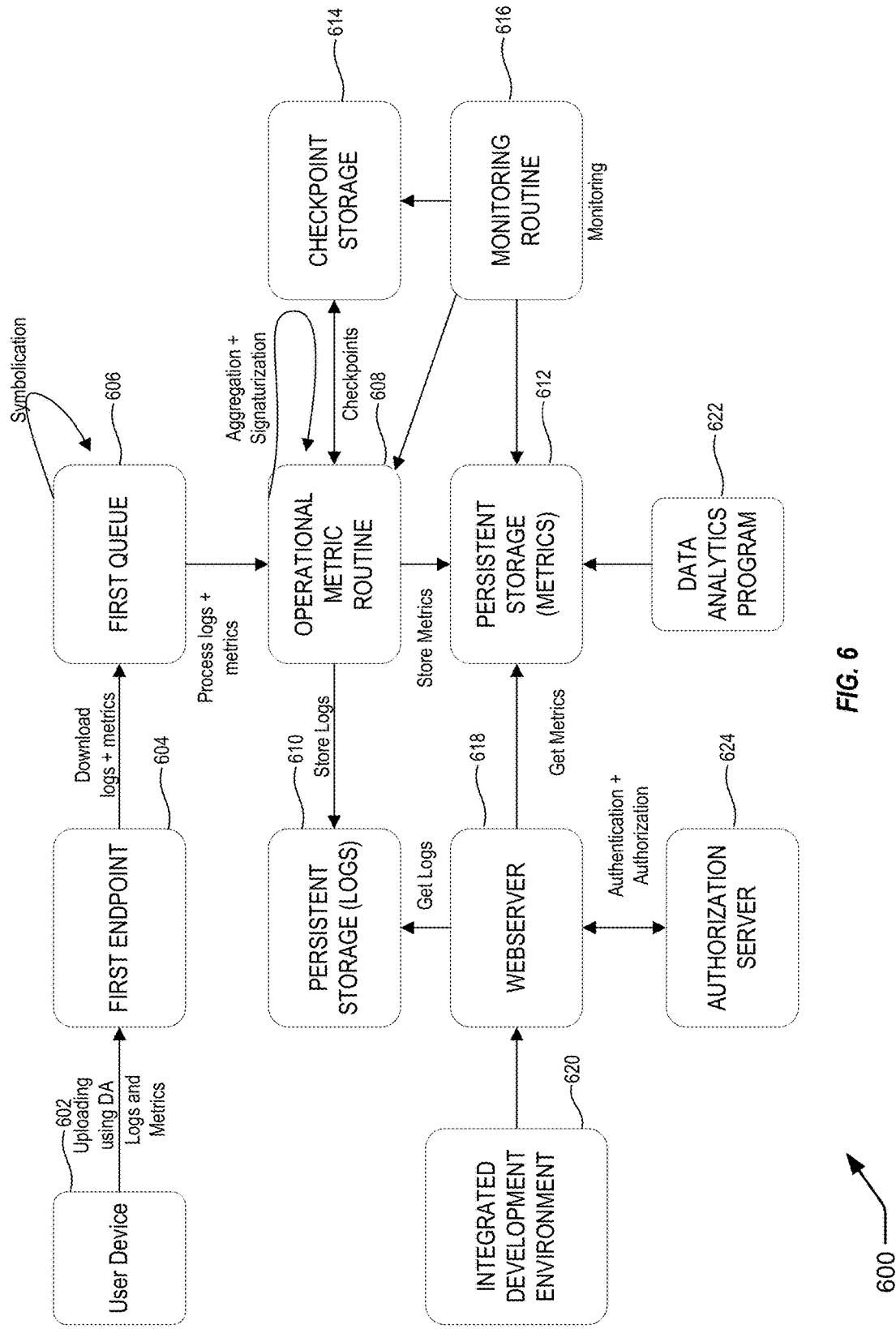
FIG. 6 illustrates an exemplary architecture for data ingestion and processing.

FIG. 6 depicts an exemplary architecture 600 for data ingestion and processing. A user device 602 can send data to a first end point 604. Although only one device is depicted in FIG. 6, in some embodiments over a million devices can be contributing data. The first end point can receive the data through a wired or wireless interface. The data can be downloaded into a first queue 606. In the first queue 606, the metric record data is put through a symbolication process. Symbolication is the process of resolving backtrace addresses to source code method or function names, known as symbols. Without first symbolicating a crash report, it would be difficult to determine where the crash occurred.

The operational metric routine 608 can start reading the data from the first queue 606 and start analyzing the data creating a periodic window (e.g., 15 minutes) and saves the aggregated data in persistent storage 612. The operational metric routine 608 can be considered a distributed job that is always running. The logs that contain details of the aggregation can also be stored in the persistent storage (logs) 610.

After a period of time elapses (e.g., 15 minutes), the operational metrics routine 608 will complete the aggregation and store the plurality of metrics to persistent storage (metrics) 612. Each executer gets a file that is synched from the device. It reads the file, processes the file, and then sends it to a reducer. The reducer now combines these files together every 15 minutes, and then stores it to a persistent storage (logs) 620 (e.g., Pi FoundationDB).

The reducer will read the data from the persistent storage 612 for the particular application, update the centroid of values for the results. So if the system 600 has to create new centroids, the system 600 will create new centroids. If it has to update and average the given centroid, it will add that and then persist the data up top to the foundation. In order to avoid failures while running, the system 600 will store the checkpoints in a checkpoint storage 614. Every few minutes the system 600 is going to keep on saving the current state of the data so that the system 600 does not lose data. So, if one of the machines doing aggregation malfunctions, the system 600 can simply restart without losing data.

The operational metric routine 608 reads the data from the persistent storage metrics 612, runs the analytics selected by the developer (e.g., for 95th percentile) for a particular version, class, devices, and operating system. The webserver 618 receives the data and exports the data to the developer using an integrated development environment (e.g., Xcode) 620. The monitoring routine 616 monitors the jobs to determine how many items have been processed and calculates some internal statistics.

A data analytics program 622 can (e.g., Tableau) can be used to collect and visualize the data. 622 collected information for a tabular view of the operational metrics. The data analytics program 622 can build powerful calculations from existing data and allow a developer to drop and drag reference lines and forecasts and review statistical summaries.

The authorization server 624 determines if the third party application is registered to receive data for analysis. The authorization server 624 can allow a developer to enter the specific metrics and features that they wish to measure and evaluate.

Figure 7:
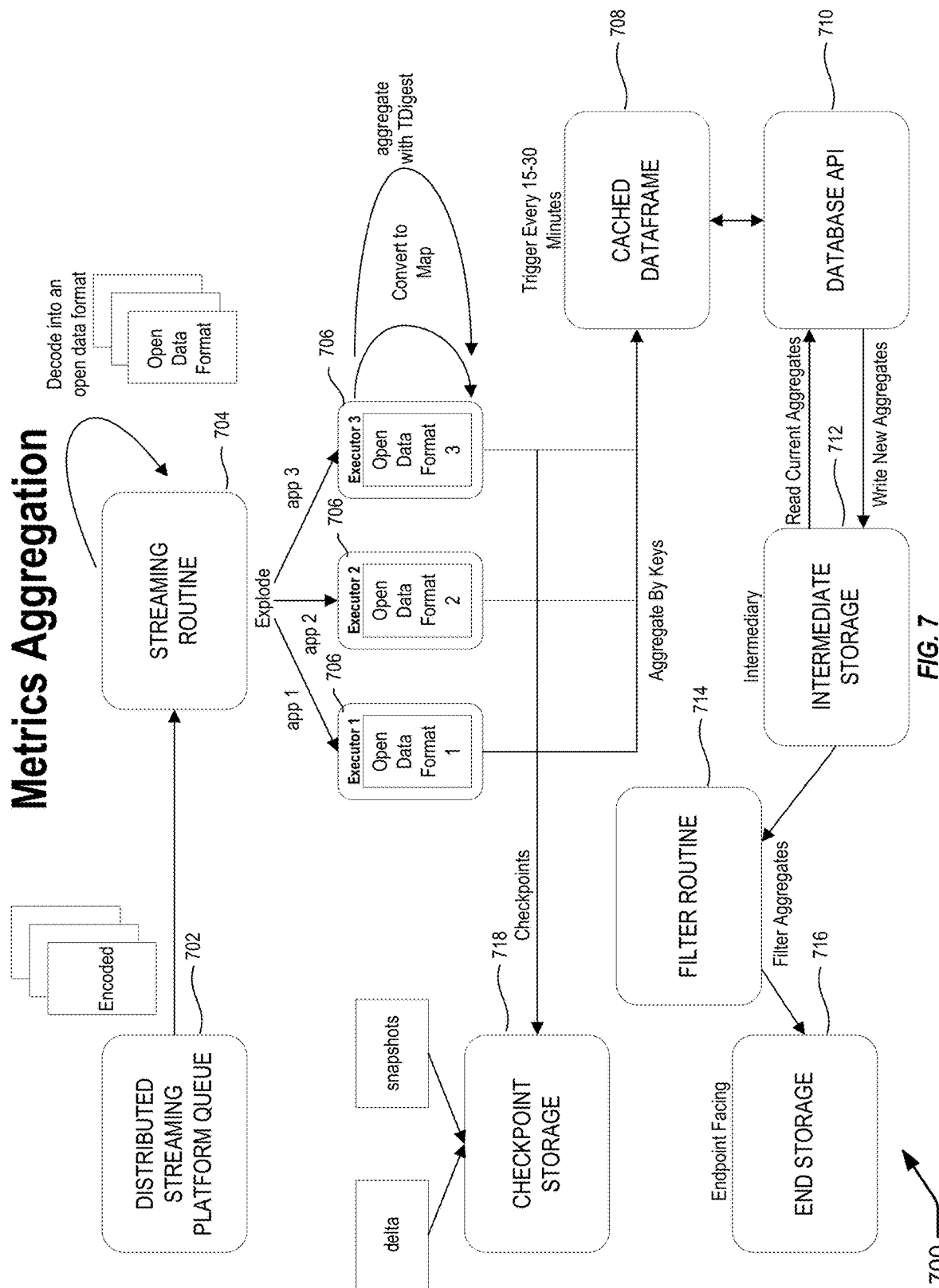
FIG. 7 illustrates an exemplary process for metrics aggregation.

FIG. 7 illustrates further details on metrics aggregation system 700. The data from the plurality of devices can be encoded, compressed files. The data files may be decoded into an open data format (e.g., JavaScript Object Notation (JSON) format). JSON (JavaScript Object Notation) is a lightweight data-interchange format. The open format data can be sent to individual executers 706.

In some embodiments, the metrics aggregation system 700 can employ an open-source distributed streaming platform (e.g., Apache Kafka). The distributed streaming platform can publish and subscribe to streams of records, similar to a message queue or enterprise messaging system, store streams of records in a fault-tolerant durable way, and process streams of records as they occur. The distributed streaming platform can be used for building real-time streaming data pipelines that reliably get data between systems or applications and/or building real-time streaming applications that transform or react to the streams of data.

The metrics record data can enter the metrics aggregation system 700 into the queue 702. The queue 702 allows for dividing up processing over a collection of processors allowing for parallel processing. From the queue 702, the coded metric records enter a streaming routine 704 that allows for any coded records to be decoded into an open data format (e.g., JSON). The metric records are then distributed to multiple executors 706, in some cases hundreds of processors, to process the data each on different machines.

The individual executors 706 can create data structures to perform a percentile (e.g., quantile) estimation. Some implementation can use centroids as part of the process to segment a data structure. Each data structure correspond to class, model, and version. A data structure includes the centroids/clusters. The centroids/clusters comprise a grouping of values. An executor can also perform checkpointing, and then aggregate and cache as a data frame for persisting in the persistent storage metrics through the API. The system will read the current data stream aggregate it, update it, and write it back. The data can be aggregated by operating system version. The operating system version is obtained from a bundle ID routine which can determine operating system version, version of the application, and device from the data.

The aggregated data can be collected into the cached data frame 708 periodically (e.g., every 15-30 minutes). The aggregated data is processed by the database application programming interface (API) 710.

After the first level aggregation has been completed, the data is stored in intermediate storage 712 so it can be used by the developer to identify the percentile of data desired. The filter routine 714 aggregates the desired data to the end storage 716.

The checkpoint storage 718 receives various checkpoints. The checkpoint storage can also receive various snapshots and delta. The checkpoints allow for rapid recall of processing should one or more of the executors fail.

Figure 8:
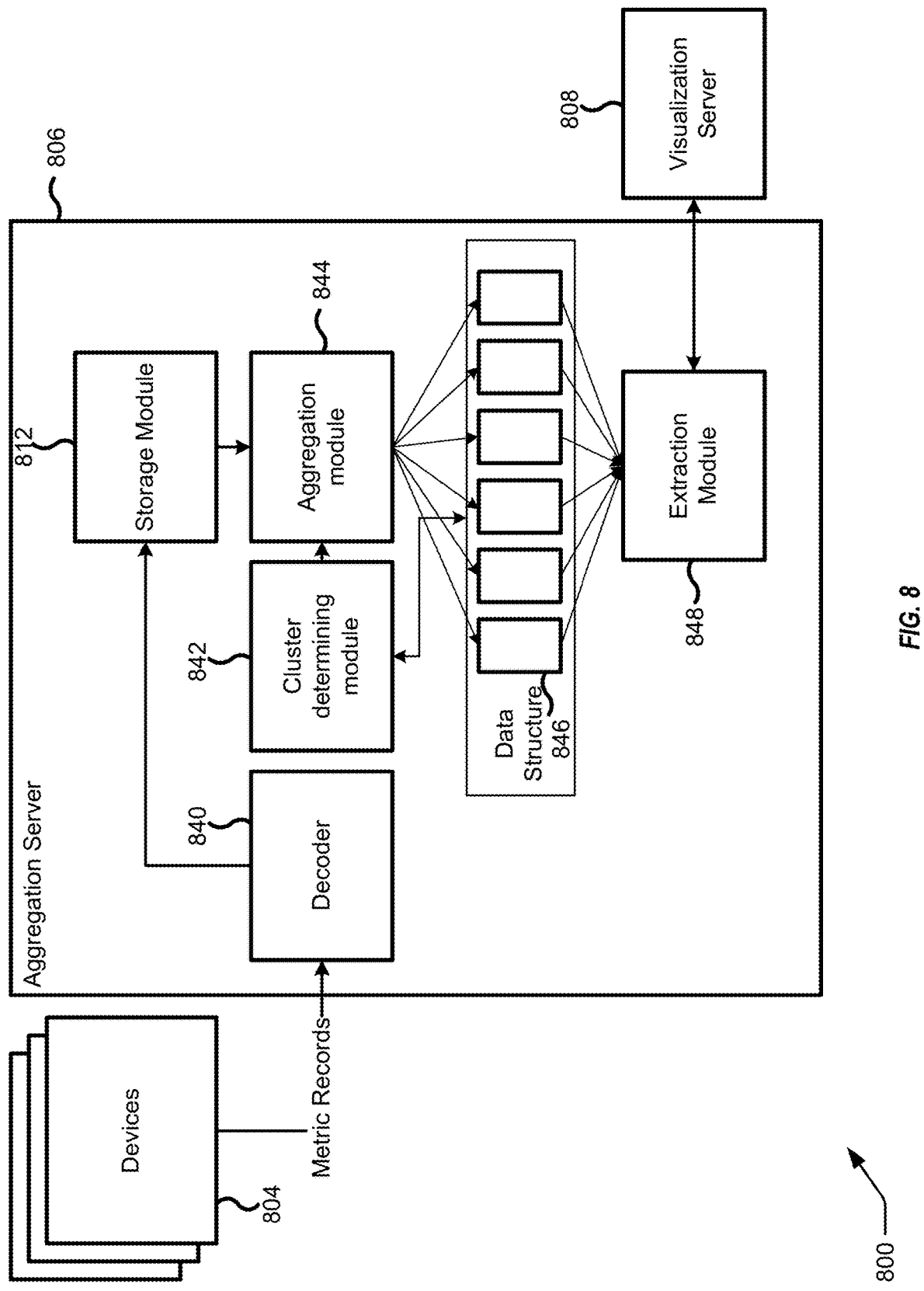
FIG. 8 illustrates an exemplary diagram for an aggregation module.

FIG. 8 illustrates an exemplary embodiment of the aggregation server 800. The aggregation server 806 receives a plurality of metric records from multiple electronic devices 804. As described in FIG. 7, the metric records include encoded, compressed files. The decoder 840 decodes and decompresses the metric records and stores the decoded and metric records in the persistent storage 812.

For each version of a third party application and operational metric, a cluster determining module 842 determines a distribution of expected values for that metric. For example, for the hang time metric, the cluster determining module 842 can determine a data structure with a number of clusters to capture incoming metric records based on the value of the metric value. The clusters can correspond to centroids determined from a statistical analysis of the metric values. For example, if the data structure for the hang time metric for version n of the third party application may have a set of ten different clusters for number of hangs per hour of application use. Some embodiments may have more than 10 clusters and some embodiments may have less. The incoming data is compared with the values assigned to each of the clusters. The value can include the following exemplary data structure (e.g., 0-0.5 hangs per hour of use (0-10%); 0.5-1.0 hangs per hour of use (10%-20%), 1.0-3.0 hangs per hour of use (20%-30%), 3.0-5.0 hangs per hour of use (30%-40%), 5.0-7.0 hangs per hour of use (40%-50%), 7.0-8.0 hangs per hour of use (50%-60%), 8.0-10.0 hangs per hour of use (60%-70%), 10.0-15.0 hangs per hour of use (70%-80%), 15.0-20.0 hangs per hour of use (80%-90%), 20 or more hangs per hour of use (90%-100%). Similar data structures can be developed for the various operational metrics.

In the aggregation module 844, the decoded metric record data can be analyzed and placed stored in a data structure 846 based on the classification (e.g., smartphone or tablet) and model (e.g., model of smartphone) for the metric record. The cluster determining module 842 can periodically re-evaluate the size and number of clusters as the data structure 846 receives the metric data. The number of clusters can be varied for each operational metric to allow for rapid retrieval of statistically significant values for the operational metrics.

An extraction module 848 can retrieve operational data based at least in part on a query from the visualization server 808. For example, a developer may be interested in the battery performance for their application for older model device (e.g., iPhone 6). The developer can select "iPhones" for the class of devices. The "iPhone" class would include several different models of iPhones (e.g., iPhone 6, iPhone 6s, iPhone XS, iPhone XS Max). Selecting only the "iPhone" class would result in the extraction module providing data for all iPhone models with existing data, However, selecting "iPhone 6" for the model would only provide operational metric information (e.g., battery performance) for iPhone 6 devices. The extraction module 848 can provide operational values for a particular version of the application (e.g., version 3.0.1). In various embodiments, the extraction module 848 can provide operational values for multiple versions of the application. In some embodiments, the extraction module 848 can provide operational values for only a selected number (i.e., significant versions) of the application. The query for the extraction module 848 can be for all software versions of a particular class, type, and operational metrics. The extraction module 848 can receive a request for certain operational metric data (e.g., power and performance metrics). The extraction module 848 can retrieve the values for the operation metrics from the various data structure 846.

Figure 9:
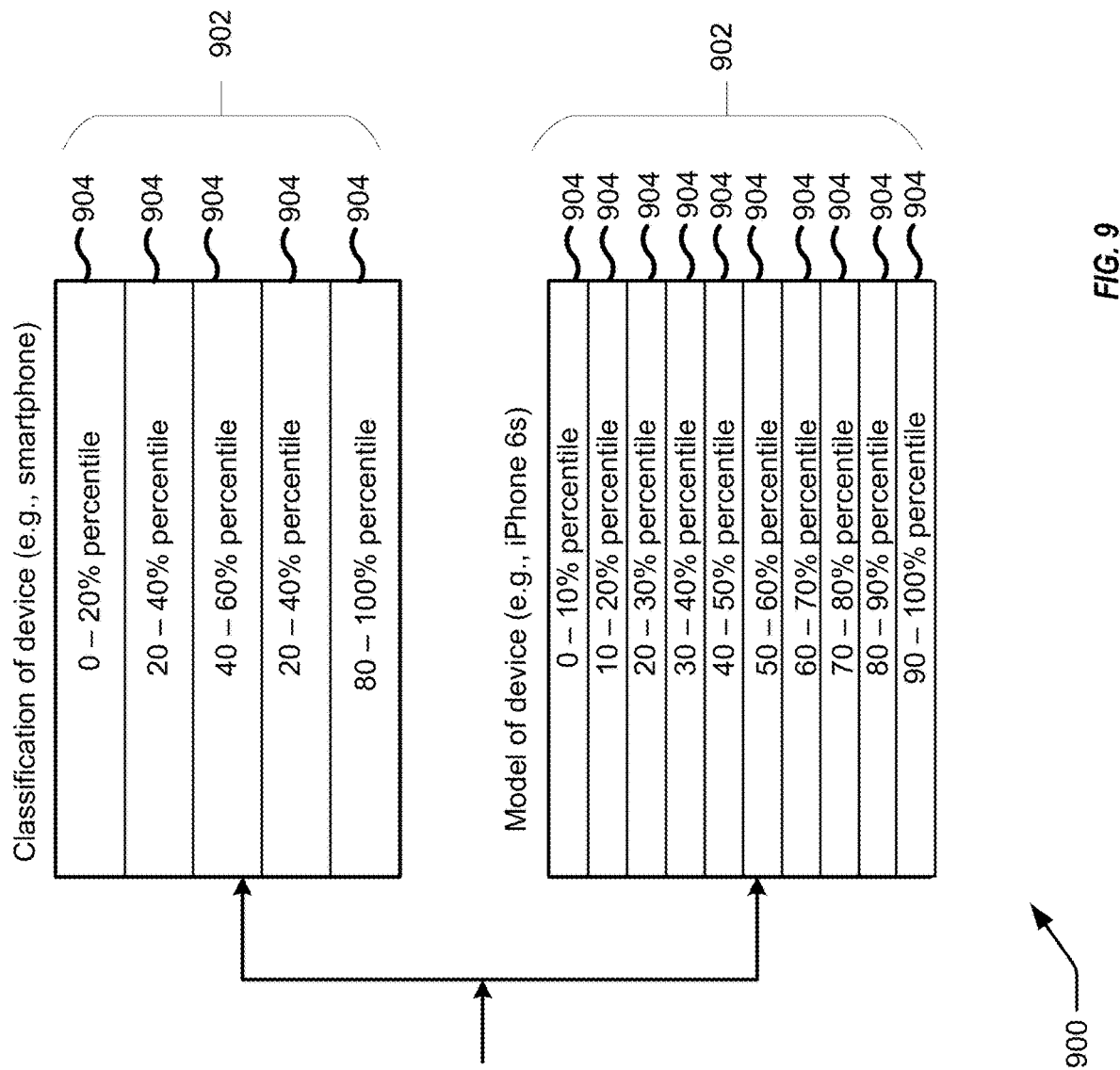
FIG. 9 illustrates a flowchart for assigning metrics to data structures and clusters depending on class and model of the device.

FIG. 9 illustrates an exemplary depiction of the aggregation module 900. The metadata for each of the data records can be analyzed to determine the classification of the device and the specific model of the device. The metric records can be sorted by the classification of the device (e.g., smartphone or tablet) and model of the device (e.g., iPhone 6s, iPhone 7, iPhone 7s, iPhone 8, iPhone 8s, iPhone X, iPhone XS, iPhone XS Max). For each of the clusters there is a data structure 902 that sorts the incoming metric record to the appropriate cluster 904 according to the value of the metric record. For example, the cluster for smartphone can have a data structure 902 with five different clusters. For the five clusters 904, each cluster 904 can represent a $20^{th}$ percentile of the data. For the model of device cluster (e.g., the iPhone 6S) there can be ten different clusters, each cluster 904 having a $10^{th}$ percentile of data. Both examples in FIG. 9 are exemplary and the data structures 902 can have any number of clusters 904 as required to properly segregate the data for easy statistical analysis.

Figure 10:
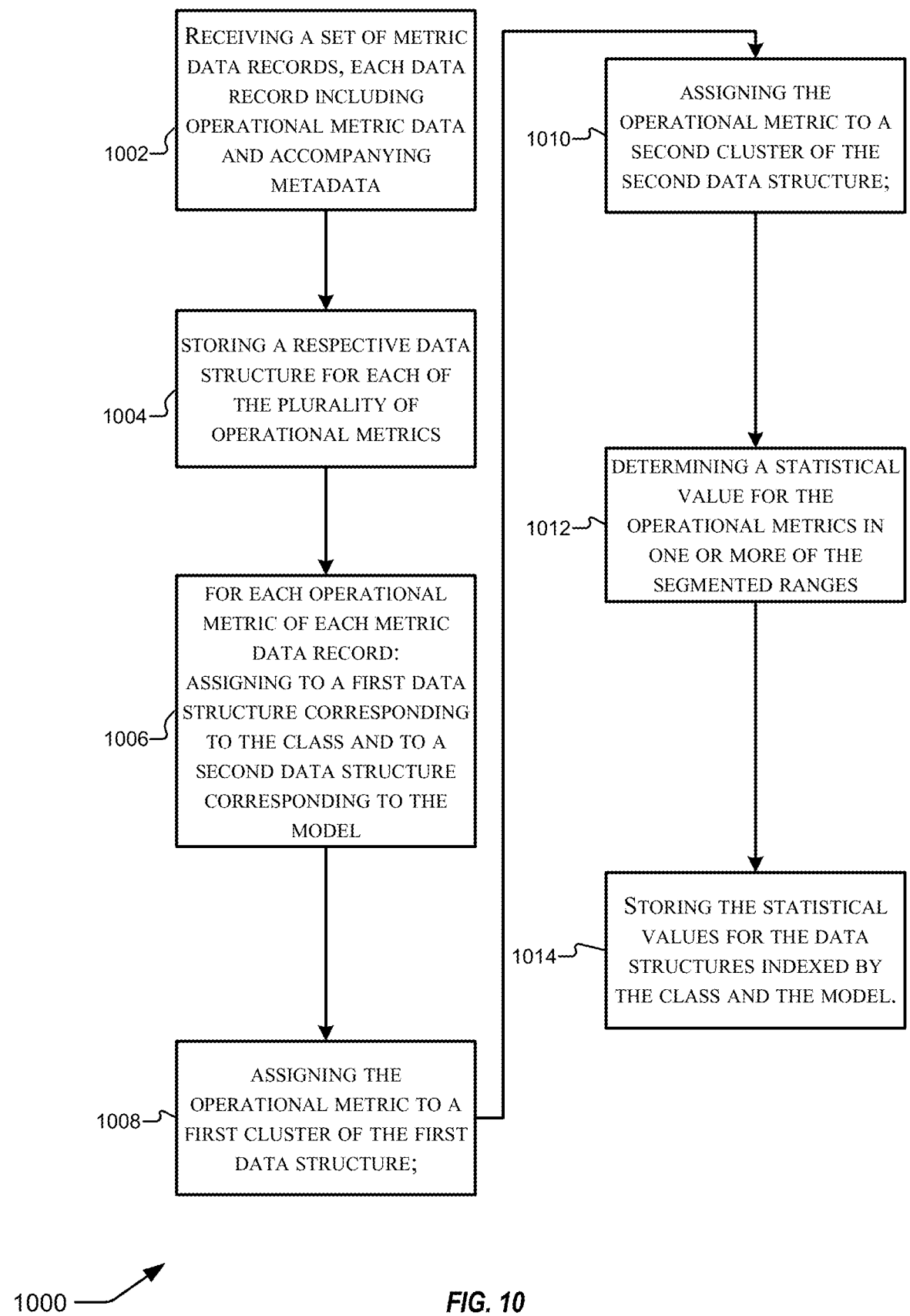
FIG. 10 illustrates a flowchart generating a data structure for aggregating metric data records into clusters of segmented ranges of values.

FIG. 10 depicts an exemplary flowchart for a process 1000 for aggregating operational data.

At 1002, the technique includes receiving a set of metric data records where each data record includes accompanying metadata. The receiving can be at a network interface of a server from a plurality of devices. Each data record can include (a) accompanying metadata that specifies a class of a device and a model of a device associated with the data record, and (b) one or more operational metrics of a plurality of operational metrics. In various embodiments, the metadata can specify the monitored application, the version of the monitored application, the operating system, and the version of the operating system.

At 1004, the technique includes storing a respective data structure for each of the plurality of operational metrics, wherein each data structure includes segmented ranges of values for a respective operational metric, wherein each segmented range corresponds to a cluster of values of operational metrics, and wherein each of a plurality of data structures correspond to one of a plurality of classes of devices or to one of a plurality of models of devices. For example, a particular data structure can store operational metrics for an entire class (e.g., smartphone) of devices. In various embodiments, the data structure can store operational metrics for a particular model of the device (e.g., an iPhone 6s). In various embodiments, the number of segmented ranges can vary. For example, one data structure can have five segmented ranges, as shown in FIG. 9, each range accounting for 20% of the data. In some embodiments, the data structure can have ten segmented ranges, as also shown in FIG. 9, each range accounting for 10% of the data. The number of segmented ranges can vary based on the distribution of the values of the operational data.

At 1006, the technique includes for each operational metric of each metric data record: assigning to a first data structure corresponding to the class and to a second data structure corresponding to the model. The accompanying metadata can identify the class and model of the device that generated the operational metric data record. The technique can reference the class and model metadata to assign each metric data record to one or more data structures. For example, metric data records from an iPhone 6s can be assigned to both the data structure for smartphones and for the data structure for the iPhone 6s model. As the data structure for class incorporates multiple models, the data structure for class will naturally include more data. The number of classes and models can change over time as new models and types of devices are developed. For example, future embodiments, can include a third class for wearable devices. Future models can include new smartphones, tablets, and models for wearable devices.

At 1008, the technique includes for each operational metric of each metric data record: assigning the operational metric to a first cluster of the first data structure. As described above, each data structure can include multiple segmented ranges. The segmented ranges can be determined by determining a range between a maximum and minimum for a value of the particular operational metric and diving that range into a definite number of segmented ranges. As the operational metric is received by the system, the value of the metric can be compared with the average values for each of the segmented ranges. For example, if a value for on screen battery usage for an application on screen time is 25% per hour, the value can be assigned to a segmented range of values for 20% to 30% per hour. The first cluster can include the group of stored values for application battery usage for on screen time for a class (e.g., smartphones) of devices in the first data structure.

At 1010, the technique includes for each operational metric of each metric data record: assigning the operational metric to a second cluster of the second data structure. As described above, each data structure can include multiple segmented ranges. The segmented ranges can be determined by determining a range between a maximum and minimum for a value of the particular operational metric and diving that range into a definite number of segmented ranges. As the operational metric is received by the system, the value of the metric can be compared with the average values for each of the segmented ranges. For example, if a value for on screen battery usage for an application on screen time is 25% per hour, the value can be assigned to a segmented range of values for 22% to 28% per hour. The second cluster can include the group of stored values for application battery usage for on screen time for a model (e.g., iPhone 6s) of a device in the device data structure. The segmented ranges for the first data structure can vary from the segmented ranges for the second data structure because of the broader range of devices for the first data structure.

At 1012, the technique includes determining a statistical value for the operational metrics in one or more of the segmented ranges. For each data structure, the segmented ranges allow for quick calculation of a statistical value for each of the operational metrics. By storing the data into segmented ranges, the technique can easily calculate an average of a particular percentile for the values of the operational metrics. In various embodiments, the developer may desire to see a value for an operational metric for a typical or $50^{th}$ percentile of devices. As the values for each segmented range is adjusted as new data is added, the technique would be able to quickly determine the average value for the $50^{th}$ percentile without adding the individual values for millions of data entries from millions of devices and dividing by the number of devices. Using a clustered data structure allows for easy calculation of a statistical value for one or more percentile classifications (e.g., $50^{th}$ percentile or 95% percentile).

At 1014, the technique includes storing the statistical values for the data structures indexed by the class and the model. The technique can store the statistical values for the data structure in a persistent storage. In various embodiments, the persistent storage can be the memory of a device. In some embodiments, the persistent storage can be an external database. The statistical values can be indexed by the class and model of the device that generated the data to allow for easy extraction of data. For example, a developer may only desire to analyze data for a particular model or a particular class of devices (e.g., battery performance for older devices).

The metric data records can be encrypted to protect user data. In some embodiments, the method includes decoding the metric data records from the plurality of devices, wherein the decoding comprises remove encryption for the metric data records.

In some embodiments, the technique can include determining the data structure for each of the plurality of operational metrics, wherein the determining includes calculating a range of values for each of the plurality of operational metrics; and dividing the range of values into a predetermined number of clusters based at least in part on an average of the values of the metric data records within the clusters.

In some embodiments, the technique can include modifying the data structure for each of the plurality of operational metrics, wherein the modifying includes calculating an updated range of values for each of the plurality of operational metrics and determining whether the predetermined number of clusters provides an average distribution of values based at least in part the updated range of values; and adjusting the data structure by increasing or decreasing the predetermined number of clusters to achieve the average distribution of values for the operational metric.

In some embodiments, the techniques can include receiving a selection of a class of the device and a model of the device. The technique can include receiving a selection of an operational metric of the plurality of operational metrics.

The technique can include receiving a selection of a percentile of values. The technique can include extracting the statistical value for the operational metrics corresponding to the data structure for the selected class of the device and the model of the device and the selected percentile of values; and transmitting the statistical values to a visualization server.

It should be appreciated that the specific steps illustrated in FIG. 10 provide particular techniques for capturing and aggregating operational metrics for a third party application according to various embodiments of the present disclosure. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

IV. Visualization of Application Metrics

Visualizing operational metrics can be provided in a consolidated manner. A challenge is to depict multiple pieces of information to a developer in a way that is easy to analyze and make decisions. A display can utilize one or more histograms, segmented circles, and/or bar graphs to effectively present data for rapid analysis. The information can be presented by application versions with significant changes.

The technique can aggregate data from millions of devices to construct a web API endpoint from which an integrated development environment (e.g., Xcode) can connect to it and provide a developer a view of those metrics in the field. A focus is application developers beyond the top 25 developers who may not be able to develop their own analytics routines. In addition it is desirable for a developer to select the classification and models to better understand the power and performance of the application for older devices as compared with newer devices with increased memory and battery capacity.

Figure 11:
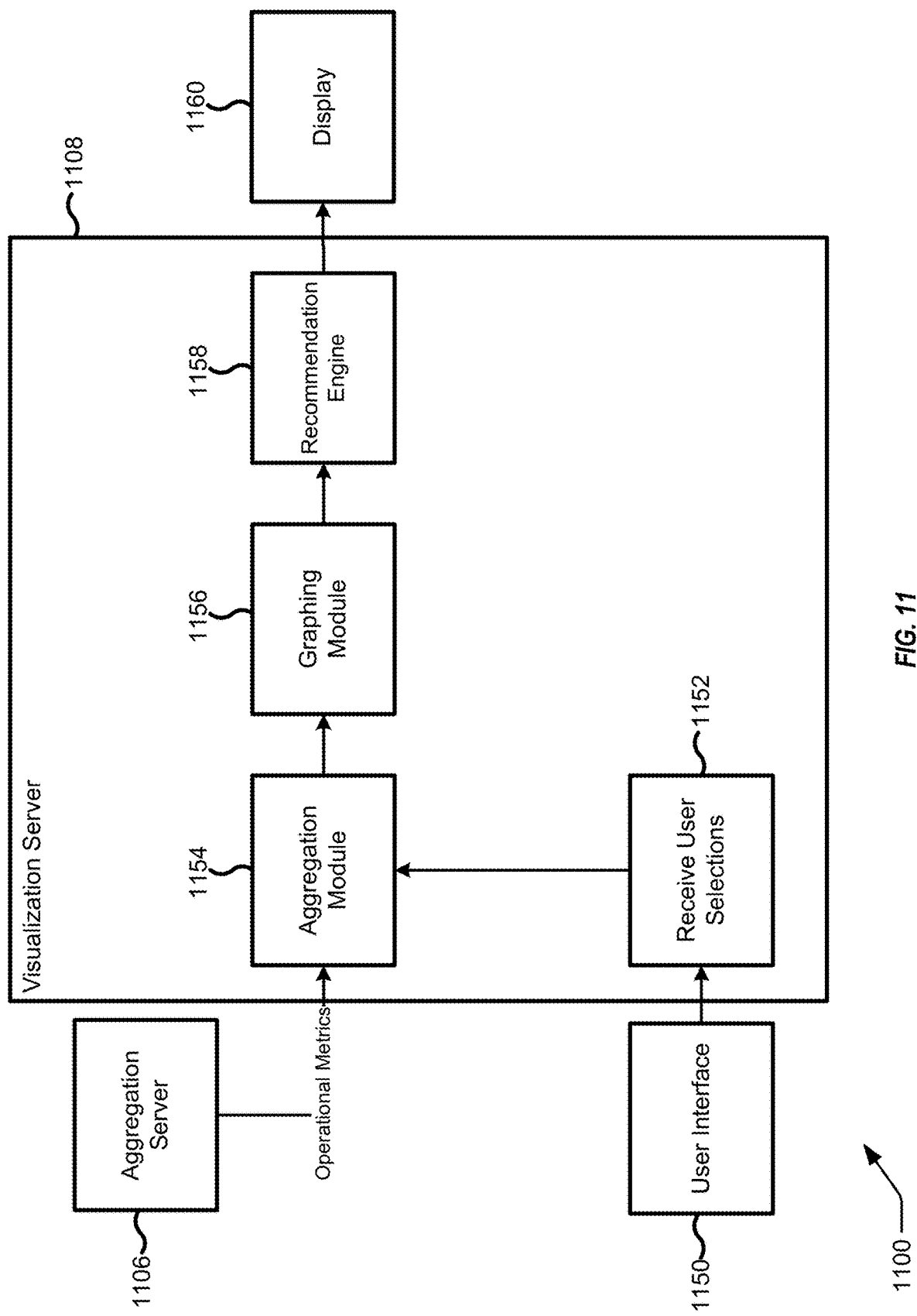
FIG. 11 illustrates an exemplary system for visualization.

FIG. 11 depicts an exemplary embodiment of the visualization process 1100 including a visualization server 1108. The visualization server 1108 can receive the operational metrics from the aggregation server 1106. The visualization server 1108 can present a user interface 1150 for a developer to enter selections 1152 to customize the display of operational metric data. These selections 1152 can include but are not limited to the classification and/or model of the device from which the data originated. The selections 1152 can also include the percentile for the data (e.g., top percentiles or typical).

Based on the selections of the developer, operational metric data is aggregated in an aggregation module 1154 for clusters and sub-clusters. A graphing module 1156 receives the aggregated data for preparation for display. Next, a recommendation engine 1158, analyzes the aggregated data and prepares one or more recommendations for the developer.

Finally, the aggregated data can be presented on one or more displays 1160.

Figure 12:
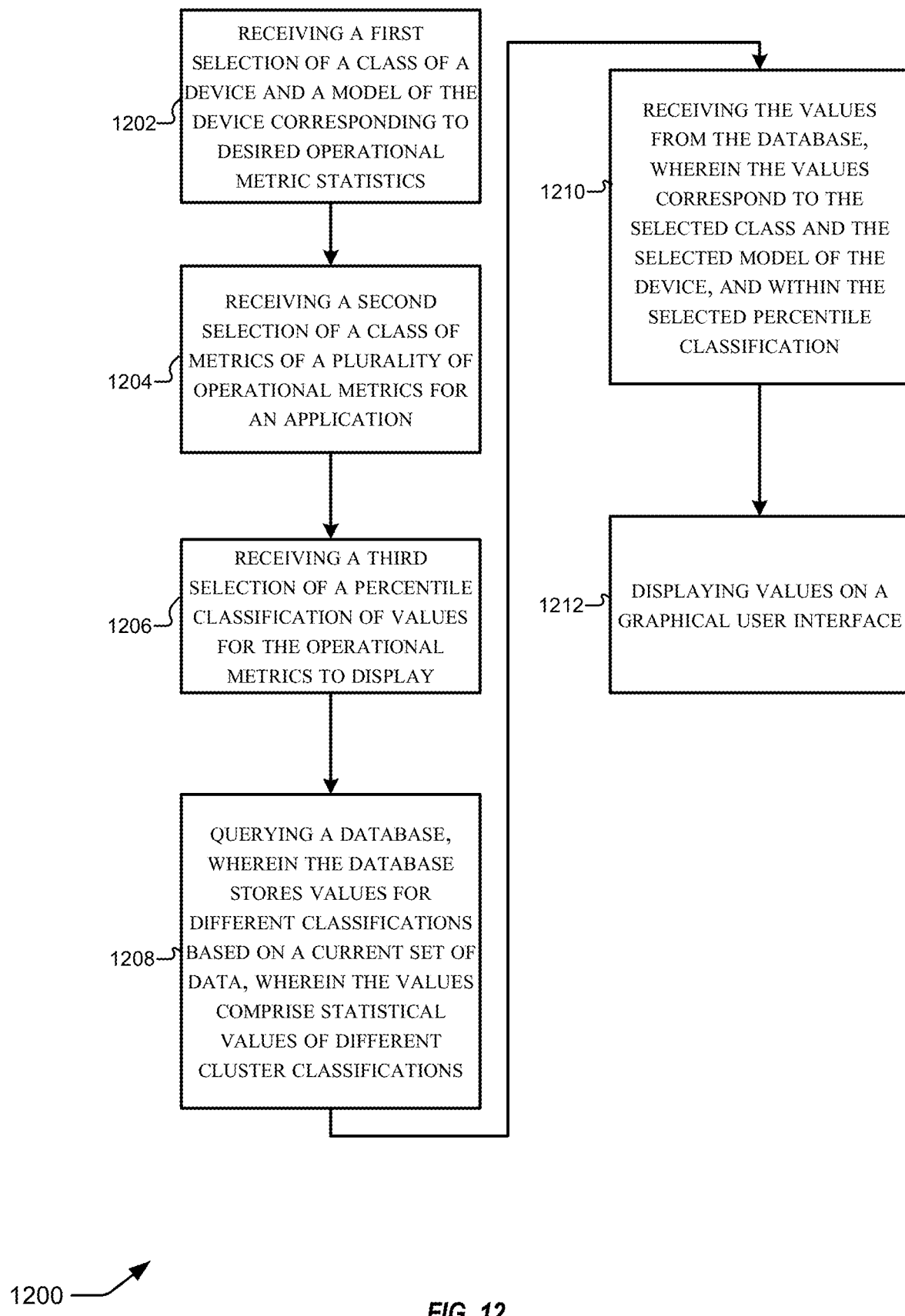
FIG. 12 illustrates a flowchart for selecting and displaying one or more operational metrics using a graphical user interface.

FIG. 12 depicts a flowchart for a process 1200 for visualizing operational metrics performed by a visualization server. The visualization server can be located remote from the device accessing the operational data. Therefore the device can access the operational data via a network (e.g., the Internet).

At 1202, the technique can include receiving a first selection of a class of a device and a model of the device corresponding to desired operational metric statistics. The receiving can be accomplished through a section of the device and model using a user interface device (e.g., a keyboard or pointing device (e.g., a mouse)). The selection of a class of the device can include a selection of smartphone or tablet. The selection of a model of the device can include a selection of a particular model of a smartphone or tablet. The selection of class and model of the device will limit the displayed operational performance metrics to the selected class and/or model of the device.

At 1204, the technique can include receiving a second selection of a class of metrics of a plurality of operational metrics for a third party application. The selection of the class of operational metrics will present performance metrics for the selected operational metric on the display. In some embodiments, the class of metrics can include at least one of the following: battery performance, launch time, hang rate, memory usage, and logical disk writes. Other class of operational metrics can be envisioned and implemented.

At 1206, the technique can include receiving a third selection of a percentile classification of values for the operational metrics to display. The selection of the percentile classification of values for the operational metrics will provide the average value for the given percentile of metric data. In some embodiments, the percentile classification of values can be selected from a drop down list. In some embodiments, the top percentiles classification can include the average of the top percentiles of data received. In some embodiments, the top percentiles classification can be the top $95^{th}$ percentile of data. In some embodiments, the typical percentile classification can include an average of the $50^{th}$ percentile of data. Other percentile classification or selections of data may be envisioned and alternatively selected.

At 1208, the technique can include querying a database using the class of the device, the model of the device, the operational metric, and the percentile classification. The database can include a plurality of data structures of operational metric values measured from a plurality of classes and models of device, each data structure corresponding to a particular operational metric, a particular class and model, and a particular version of the application. Each data structure can include a plurality of clusters of operational metric values. Each cluster can correspond to a different percentile classification and have a statistical value for the operational metric values of the cluster. The querying can be accomplished through sending one or more electronic signal or one or more electronic messages through a network connection (e.g., the Internet).

At 1210, the technique can include receiving, from the database in response to the querying, statistical value corresponding to the percentile classification of a set of data structures corresponding to a set of versions of the application, wherein the statistical value corresponds to the average for the selected class and the selected model of the device. The receiving can be accomplished through sending the data values through a network (e.g., the Internet).

Figure 13:
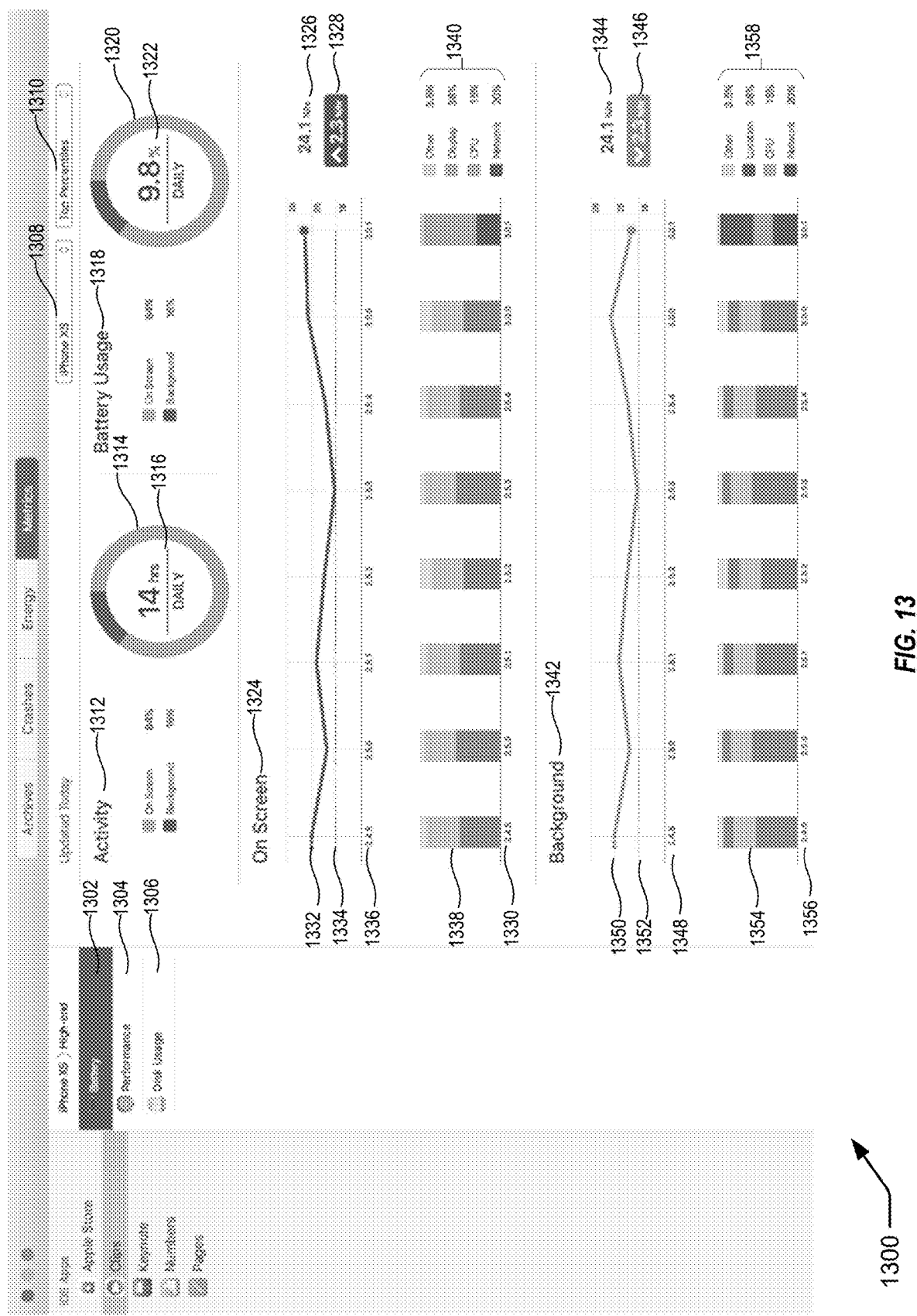
FIG. 13 illustrates an exemplary graphical user interface for application power consumption.

At 1212, the technique can include displaying values on a graphical user interface. In some embodiments, the techniques can include displaying the values for a plurality of versions of the third party application as a vertical bar chart. For example, FIG. 13 illustrates a vertical bar chart for the battery usage for both on screen 1338 and background 1354. In some embodiments, the techniques can include depicting an industry standard reference line at the value on the vertical bar chart. The industry standard reference line represents the industry standard value for the operational metric for a class of third party application. The values can be displayed using various different graphs (e.g., bar charts, line graphs, segmented circles, etc.) The values can be displayed as numerical values. In various embodiments, the values can be displayed adjacent to one or more values from different versions of the application to allow for easy comparison.

In some embodiments, the technique can include displaying the values for the one or more metric data records for a plurality of versions of the third party application as a stacked vertical bar chart. The stacked vertical bar chart can provides a breakdown of the sources for the values for the one or more metric data records.

In some embodiments, the techniques can include displaying a percentage change in the value for the one or more metric data records since a last version of the third party application.

In some embodiments, the techniques can include providing the displaying the values for the one or more metric data records for a plurality of versions of the third party application as a plurality of segmented circles. The segmented circles can depict a breakdown of the sources for the values for the one or more metric data records.

In some embodiments, the techniques can include displaying a plurality of values for a plurality of metric data records for a plurality of versions of the third party application. Each of the plurality of values of the metric data records can be depicted in a horizontal line chart on a display screen.

The statistical value can corresponds to a mean, a median, or a mode for the selected class and the selected model of the device. The statistical value corresponds to a mode for the selected class and the selected model of the device. The statistical values can be generated from the set of data structures in response to the querying. The statistical values can be generated from the set of data structures periodically. The statistical value could already be pre-generated, e.g., done periodically, or done on demand.

It should be appreciated that the specific steps illustrated in FIG. 12 provide particular techniques for capturing and aggregating operational metrics for a third party application according to various embodiments of the present disclosure. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

A. Battery Visualization User Interface

FIG. 13 illustrates an exemplary user interface 1300 for analyzing battery usage for a third party application. In some embodiments, the user interface 1300 can allow for selection of power metrics 1302, performance metrics 1304, or disk usage metrics 1306. Battery metrics are displayed in FIG. 13.

In some embodiments, the exemplary user interface 1300 can display activity for the application. The user interface 1300 can allow the user to select a class or model of a device 1308 from a drop-down menu. For example, the data depicted in FIG. 13 is for the iPhone XS device. The user interface 1300 can allow the user to select a percentile of metrics 1310. In some embodiments, there are two options: top percentiles (e.g., $95^{th}$ percentile of values) and typical (e.g., $50^{th}$ percentile). Selecting top percentiles would depict and average of values for the top percentile of stored values. Selecting typical would depict an average of values for the $50^{th}$ percentile of stored values.

The user interface 1300 can depict the activity 1312 of the application as a depiction of foreground (FG), or on-screen, time and the background (BG) time for the application. The activity time can present the FG/BG time as a segmented circle 1314. In addition, the total activity level 1316 for the application activity time for the application can be depicted as a numerical value. For example, in FIG. 13 the total activity level 1316 depicted is 14 hours with 84% in the foreground (on-screen) and 16% in the background.

The user interface 1300 can depict a battery usage 1318 for the application. The battery usage 1318 can be divided between foreground (FG), or on-screen, time and the background (BG) time for the application. The battery usage data can also be depicted as a second segmented circle 1320 showing the percentage of FG and BG time as percentages in a single circle. In addition, the total power usage 1322 as a percentage of total battery capacity can be displayed for the application as a numerical value. For example, in FIG. 13 the application accounts for 9.8% of total battery capacity daily with 84% in the foreground (on-screen) and 16% in the background.

In some embodiments, the user interface can provide a summary as well as what other others are recommended for the metrics depicted. And for the summary, the techniques would look at the metric and provide a recommendation if certain conditions are met. For example, if the total batter percentage was 0.01 percent (instead of the 9.8% depicted), the technique would inform the developer that they should worry more about engagement and other things for their application because battery usage is very low. In some embodiments, the numerical output can be color coded (e.g., red for problematic, yellow for cautionary, and green for excellent).

The on screen usage histogram 1324 can show a history of battery drain in percentage per hour 1326 of use for an application being run in the foreground, or on-screen. The on-screen histogram 1324 can also depict a percentage change 1328 since the last significant version of the application. For example, in FIG. 13 depicts that from version 3.0.0 to 3.0.1 of the application, the on-screen battery usage increased by 2.3 percent. In order to assist the developer in correcting this undesirable increase, FIG. 13 depicts the distribution of on-screen battery usage among subsystems as percentage breakdown 1340. In some embodiments, the percentage breakdown 1340 on lists the top three subsystems and the remaining are grouped in "other." The application version 1330 can be depicted along the bottom of the histogram 1324. A history line 1332 can show the change from one version to another. The dotted line 1336 depicts the value for best in class for battery drain on-screen.

Not all versions need to be shown in the various histograms. The versions need not be a linear list of all versions, but may only include versions with more significant changes. So especially for an application that is releasing a new version every week, the technique wants to inform developers of what they should strive towards, but also what they were able to achieve in the past. For example, the technique may depict what was their best in the last year, then the leftmost point might be a version 52 weeks ago. The technique can then display values for a version 26 weeks ago, and then values at the 13th week. The technique may then display for six, five, four, three, two, one week ago. In some embodiments, it the versions may be based on metrics such as most used versions of the application or the version with the most significant problems.

The techniques normalize the energy consumption in two ways. First is that the technique translates the energy to percentage of battery. The reason that the technique is using percentage of battery is across all the various electronic device classes (e.g., iPhone and iPad), there is a lot of effort made to make sure that the batteries are sized effectively to have a reasonable battery life experience. So if one considers an larger device (e.g., iPhone XS Max) versus a smaller device (e.g., iPhone XS), the screen size is much bigger on the larger device and hence the energy drain is much bigger. However, often the manufacturer installed a larger battery to compensate for the larger display size.

From percentage of battery level, the technique does an external level of normalization on the actual amount of time on screen use has happened. So if in version 3.0.0, users were using their device only five minutes in a day but in version 3.0.1, it is actually 50 minutes per day, by actually computing the power usage as a rate of drain as percent of battery per hour of usage, the techniques are actually making it even more insensitive to these extraneous factors and make it more meaningful for developers to optimize. This is especially true when you get to background, it becomes even more interesting because background audio normalizing by actual background audio playback time or background navigation the same way. For background other, the techniques actually treat it differently because background other is not tied to explicit user usage. For background other is the amount of energy drained in all that unplugged time that is not on screen or background audio or navigation, you would take that energy and divide it by the wall clock time because from a user standpoint, what this is as when a user is not using their device Application X was draining Y percent per hour in the background.

So if you look at the rate of drain on an on screen scenario, it is going to be very similar. One might be ten percent per hour, one might be ten and a half per hour. But as long as their device mix is not changing night and day between two versions, the techniques will allow a reasonably good level of aggregation by using the percentage of the battery.

In some embodiments, the on screen history 1324 can present a vertical bar graph illustrating the source of the battery drain 1338 for each version number. The percentage breakdown 1340 for the source of the battery drain for the latest version can also be depicted. For example, in FIG. 13 the display accounts for 38% of battery drain, the network accounts for 20% of battery drain, the CPU accounts for 15% of batter drain, and other accounts for 3.5% of battery drain. The distribution between subsystems is merely exemplary and other categories can be included. The percentage breakdown 1340 can assist the developer in reducing the exemplary 2.3% increase in battery usage from the last version because there appears to be a significant increase in display battery usage between versions 3.0.0 and 3.0.1. This can be an indication of a bug in the code causing the brightness on the display to be set too high.

In some embodiments, the percentage breakdown 1340 may not always be displayed on the display. In some embodiments, a user can hover a cursor over the data point for the version and a donut breakdown would appear in a pop-up window. This would allow for fitting additional metrics on the power or performance display screens.

The background usage histogram 1342 can show a history of battery drain in percentage per hour 1344 of use for an application being run in the background. The background histogram 1342 can also depict a percentage change 1346 since the last significant version of the application. The application version 1348 can be depicted along the bottom of the histogram 1342. A history line 1350 can show the change from one version to another. The dotted line 1352 shows best in class for battery drain in the background for the application.

In some embodiments, the on background history 1342 can present a vertical bar graph 1354 illustrating the source of the battery drain for each version 1356 of the application. The percentage breakdown 1358 for the source of the battery drain for the latest version can also be depicted. For example, in FIG. 13 the location accounts for 38%, the network accounts for 20%, the location accounts for 38%, and other accounts for 3.5% of battery drain. The distribution between subsystems is merely exemplary and other categories can be included. For example, audio is becoming a significant power factor for applications running in the background. The other significant background drain is navigation.

Figure 14:
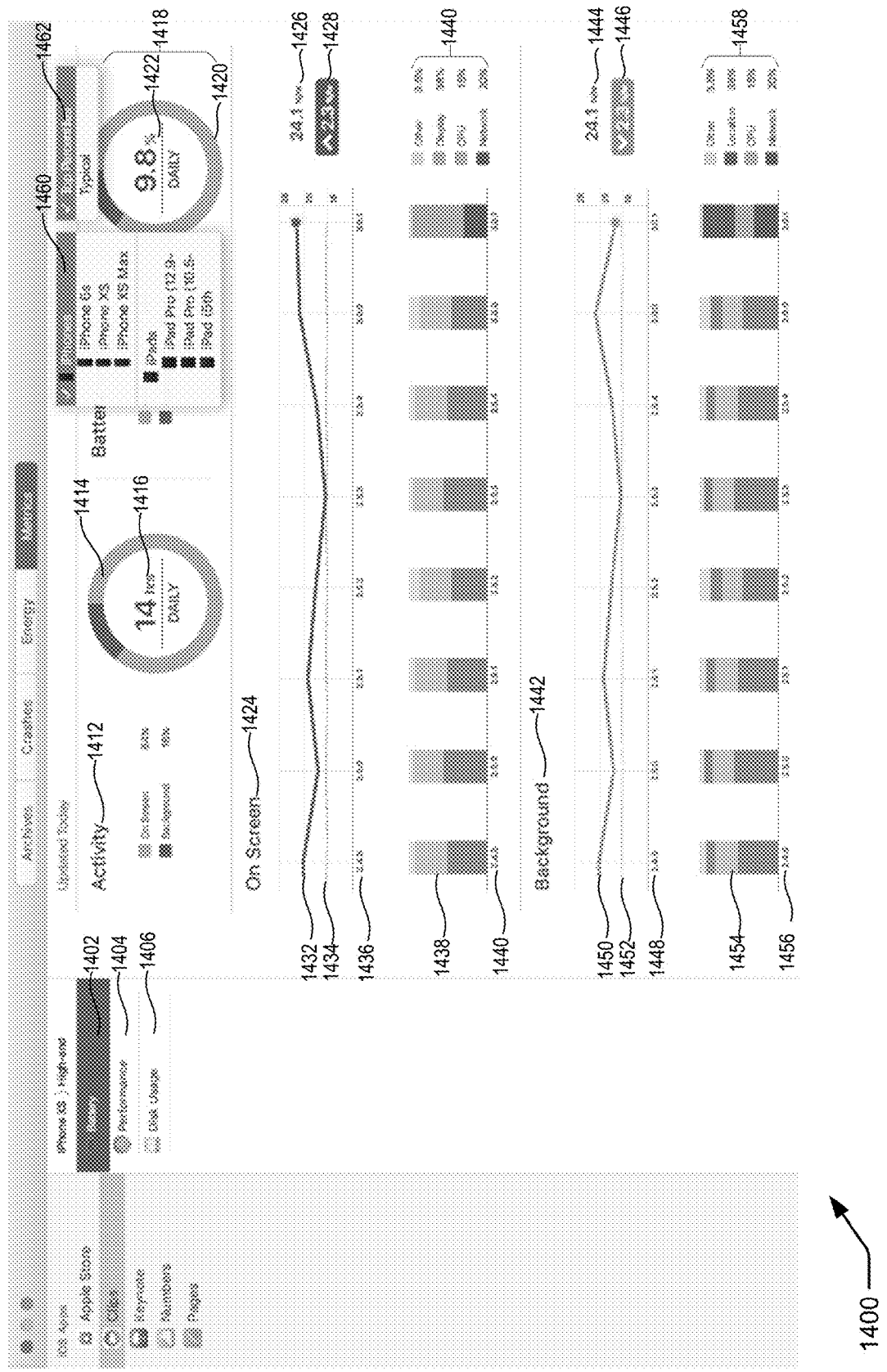
FIG. 14 illustrates an second exemplary graphical user interface for application power consumption.

FIG. 14 illustrates an exemplary user interface 1400 for analyzing battery usage for a third party application. FIG. 14 is similar to FIG. 13 but depicts the exemplary pull-down menus for class and device 1460 and percentiles 1462 for the battery metrics. In some embodiments, the user interface 1400 can allow for selection of power metrics 1402, performance metrics 1404, or disk usage metrics 1406. Battery metrics are displayed in FIG. 14.

In some embodiments, the exemplary user interface 1400 can display activity for the application. The user interface 1400 can depict the user selection for a class and model of a device 1460. For example, the data depicted in FIG. 14 is for the iPhone XS device. The user interface 1400 can depict the user selection for percentile of metrics. In some embodiments, there are two options: top percentiles (e.g., $95^{th}$ percentile of values) and typical (e.g., $50^{th}$ percentile). The top percentile values can be application dependent. For some application or operational metrics, the top percentile may be $98^{th}$ percentile of values. If an application has many more samples, and a lot more usage, then a certain percentile of data may be more interesting to highlight to the developer where action needs to be taken. Selecting top percentiles would depict and average of values for the top percentile of stored values. Selecting typical would depict an average of values for the $50^{th}$ percentile of stored values.

For example, if there are one billion devices there may only be one hundred million devices that are using the application being evaluated. For those devices running the application, many can be submitting operational metrics. The technique does some filtering to reduce some outliers and all remaining operational values can be plotted using a cumulative distribution function (CDF). In various embodiments, the user can select to observe values for the $98^{th}$ percentile of values. The technique allows a developer to select the right percentile of data that will highlight the value in developer's data. And by looking at the CDF, the technique could be able to show inflection points on it or some sort of shape or positions that provide the developer stable data results.

The percentiles can be calculated on the battery usage part. The technique does not sort each metric of on screen and background separately, because then they are not consistent with each other because when the technique provided 84 percent for those percentiles of 9.8%, the technique must show the on screen rate for that 84 percent rather than now it is for a different set of users because the system sorted each independently. So what the technique does is to isolate those devices and after a developer selected the desired percentile, the technique will select a band around that percentile. And for that the technique will calculate averages. So if a developer selects the top percentiles (e.g., 95$^{th}$ percentile), the system will calculate a one percent band around that percentile of data. The band can vary in width depending on the number of users for the application. For applications with less users, the bands will need to be larger. However, too large a band may cause the metrics to fluctuate too much to be usable.

FIG. 14 depicts the class and model selector 1460 to allow a developer to select the relevant class (e.g., iPhone or iPad) and model (e.g., iPhone XS) for normalizing the operational metrics. The percentiles selector 1462 allows a developer to select either "top percentiles" or "typical" percentiles to vary the operational metric averages used for analysis.

The user interface 1400 can depict the activity 1412 of the application as a depiction of foreground (FG), or on-screen, time and the background (BG) time for the application. The activity time can present the FG/BG time as a segmented circle 1414. In addition, the total activity level for the application activity time 1416 for the application can be depicted as a numerical value.

The user interface 1400 can depict a battery usage 1418 for the application. The battery usage 1418 can be divided between foreground (FG), or on-screen, time and the background (BG) time for the application. The battery usage data can also be depicted as a segmented circle 1420 showing the percentage of FG and BG time as percentages in a single circle. In addition, the total power usage 1422 as a percentage of battery capacity can be displayed for the application as a numerical value.

The on screen usage histogram 1424 can show a history of battery drain in percentage per hour 1426 of use for an application being run in the foreground, or on-screen. The on-screen histogram 1424 can also depict a percentage change 1428 since the last significant version of the application. The application version 1436 can be depicted along the bottom of the histogram 1424. A history line 1432 can show the change from one version to another. The dotted line 1434 depicts the value for best in class for battery drain on-screen.

In some embodiments, the on screen history 1424 can present a vertical bar graph illustrating the source of the battery drain 1438 for each version number. The percentage breakdown 1440 for the source of the battery drain for the latest version can also be depicted. For example, in FIG. 14 the display accounts for 38% of battery drain, the network accounts for 20% of battery drain, the CPU accounts for 15% of batter drain, and other accounts for 3.5% of battery drain.

The background usage histogram 1442 can show a history of battery drain in percentage per hour 1444 of use for an application being run in the background. The background histogram 1442 can also depict a percentage change 1446 since the last significant version of the application. The application version 1448 can be depicted along the bottom of the histogram 1442. A history line 1450 can show the change from one version to another. The dotted line 1452 depicts the value for best in class for battery drain in the background.

In some embodiments, the on background history 1442 can present a vertical bar graph 1454 illustrating the source of the battery drain for each version 1456 of the application. The percentage breakdown 1458 for the source of the battery drain for the latest version can also be depicted. For example, in FIG. 14 the location accounts for 38%, the network accounts for 20%, the location accounts for 38%, and other accounts for 3.5% of battery drain.

Figure 15:
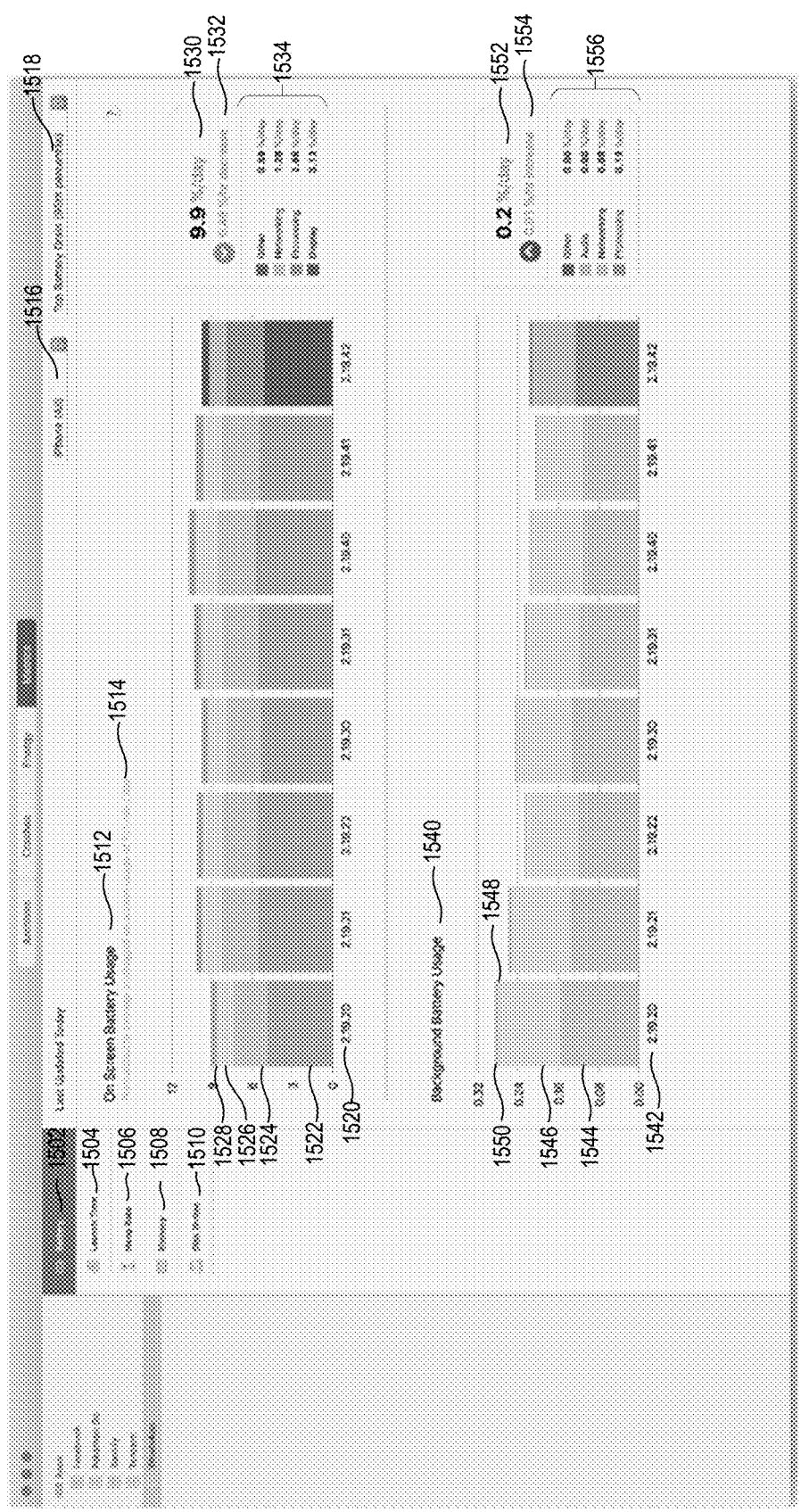
FIG. 15 illustrates a third exemplary graphical user interface for displaying application performance metrics.

FIG. 15 illustrates another exemplary an exemplary user interface 1500 for analyzing battery usage for a third party application. FIG. 15 is similar to FIGS. 13 and 14. In some embodiments, the user interface 1500 can allow for selection of power metrics 1502, launch time 1504, hang rate 1506, memory 1508, and disk writes 1510. Battery metrics are displayed in FIG. 15. In some embodiments of the battery metrics, the battery metrics can be divided into on-screen battery usage 1512 and background battery usage 1530. In some embodiments an average un-plugged usage time 1514 can be depicted.

FIG. 15 illustrates a first drop down menu 1516 for selection of class and model of device. FIG. 15 indicates that "All" models of iPhone are selected. Therefore, the battery data displayed is aggregated for all models of iPhones. FIG. 15 illustrates a second drop down menu 1518 that allows for selection of percentile of data displayed. In FIG. 15, the data displayed included "Top Battery Drain" for "95$^{th}$ Percentile of data."

In some embodiments, the exemplary user interface 1500 can display activity for the application. The user interface 1500 can depict the user selection for a class or model 1516 of a device.

For example, if there are one billion devices, and for the application being analyzed only hundred million devices are using it. For those devices, can all be submitting operational metrics. The technique does some filtering which reduces some outliers and all remaining operational values can be plotted using a cumulative distribution function (CDF). The technique can look at the 95th percentile, for example, that would be what that metric is. The idea is to be able to automatically select the right percentile that will highlight the value in developer's data. And by looking at the CDF, the technique could be able to show inflection points on it or some sort of shape or positions that provide the developer stable data results.

The percentiles can be calculated on the battery usage part. The technique does not sort each metric of on screen and background separately, because then they are not consistent with each other because when the technique provided 84 percent for those percentiles of 9.8%, the technique must show the on screen rate for that 84 percent rather than now it is for a different set of users because the system sorted each independently. The technique isolates those devices and after a developer has selected the desired percentile, the technique will select a band around that percentile. And for that the technique will calculate averages. So if a developer selects the top percentiles (e.g., 95$^{th}$ percentile), the system will calculate a one percent band around that percentile of data. The band can vary in width depending on the number of users for the application. For applications with less users, the bands will need to be larger. However, too large a band may cause the metrics to fluctuate too much to be usable.

FIG. 15 illustrates a stacked vertical bar chart for the on screen battery usage display. In the stacked vertical bar chart, each stack represents the data for a different version of the application. The version number 1520 is depicted underneath the stack. In FIG. 15, versions 2.19.20, 2.19.21, 2.19.22, 2.19.30, 2.19.31, 2.19.40, 2.19.41, and 2.19.42. In some embodiments only the significant versions may be displays. Significant versions may result in a measurable change in performance or threshold number of lines of code changes. Therefore, all versions may not be depicted.

For example, the first version number 1520 depicted is version 2.19.20. The vertical bar chart depicts a breakdown of the contribution for each of an identified number of major sources for the battery drain. For example, the major sources can include display 1522, processing 1524, networking 1526, and other 1528.

The on screen usage histogram can show a history of battery drain in percentage per hour of use for an application being run in the foreground, or on-screen. The on-screen battery usage value 1530 and a percentage change 1532 since the last significant version of the application can be displayed in the user interface 1500. For example, FIG. 1530 depicts the on-screen battery usage value 1530 is 9.9% per day. Therefore, the application accounts for 9.9% of total battery usages per day for version number 2.19.42. The percentage change since the last significant version (ver. No. 2.19.41) is a decrease of 0.49% per hour decrease. On screen battery usage summary 1534 for the latest version (ver. 2.19.42) of the application depicts a description of the major sources of battery drain for that version of the application. For example, in FIG. 15, for version 2.19.42 the display accounts for 5.13% per day, the processing accounts for 2.88% per day, the networking accounts for 1.28% per day, and other accounts for 0.59 percent per day.

In the stacked vertical bar chart, for background battery usage 1540 each stack represents the data for a different version of the application. The version number 1542 is depicted underneath the stack. In FIG. 15, versions 2.19.20, 2.19.21, 2.19.22, 2.19.30, 2.19.31, 2.19.40, 2.19.41, and 2.19.42. In some embodiments only the significant versions may be displays. Significant versions may result in a measurable change in performance or threshold number of lines of code changes. Therefore, all versions may not be depicted.

The vertical bar chart depicts a breakdown of the contribution for each of an identified number of major sources for the battery drain. For example, the major sources can include, processing 1544, networking 1546, audio 1548, and other 1550.

The background battery usage value 1552 and a percentage change 1554 since the last significant version of the application. For example, FIG. 1552 depicts the background battery usage value 1552 is 0.2% per day. Therefore, the application accounts for 0.2% of total battery usages per day for version number 2.19.42. The percentage change since the last significant version (ver. No. 2.19.41) is an increase of 0.01% per hour increase. On screen battery usage summary 1556 for the latest version (ver. 2.19.42) of the application depicts a description of the major sources of battery drain for that version of the application. For example, in FIG. 15, for version 2.19.42 the processing accounts for 0.13% per day, the networking accounts for 0.09% per day, audio accounts for 0.00% per day, and other accounts for 0.00% per day.

The background usage histogram 1442 can show a history of battery drain in percentage per hour 1444 of use for an application being run in the background. The background histogram 1442 can also depict a percentage change 1446 since the last significant version of the application. The application version 1448 can be depicted along the bottom of the histogram 1442. A history line 1450 can show the change from one version to another. The dotted line 1452 depicts the value for best in class for battery drain in the background.

In some embodiments, the on background history 1442 can present a vertical bar graph 1454 illustrating the source of the battery drain for each version of the application. The percentage breakdown 1458 for the source of the battery drain for the latest version can also be depicted. For example, in FIG. 14 the location accounts for 38%, the network accounts for 20%, the location accounts for 38%, and other accounts for 3.5% of battery drain.

B. Performance Visualization User Interface

Figure 16:
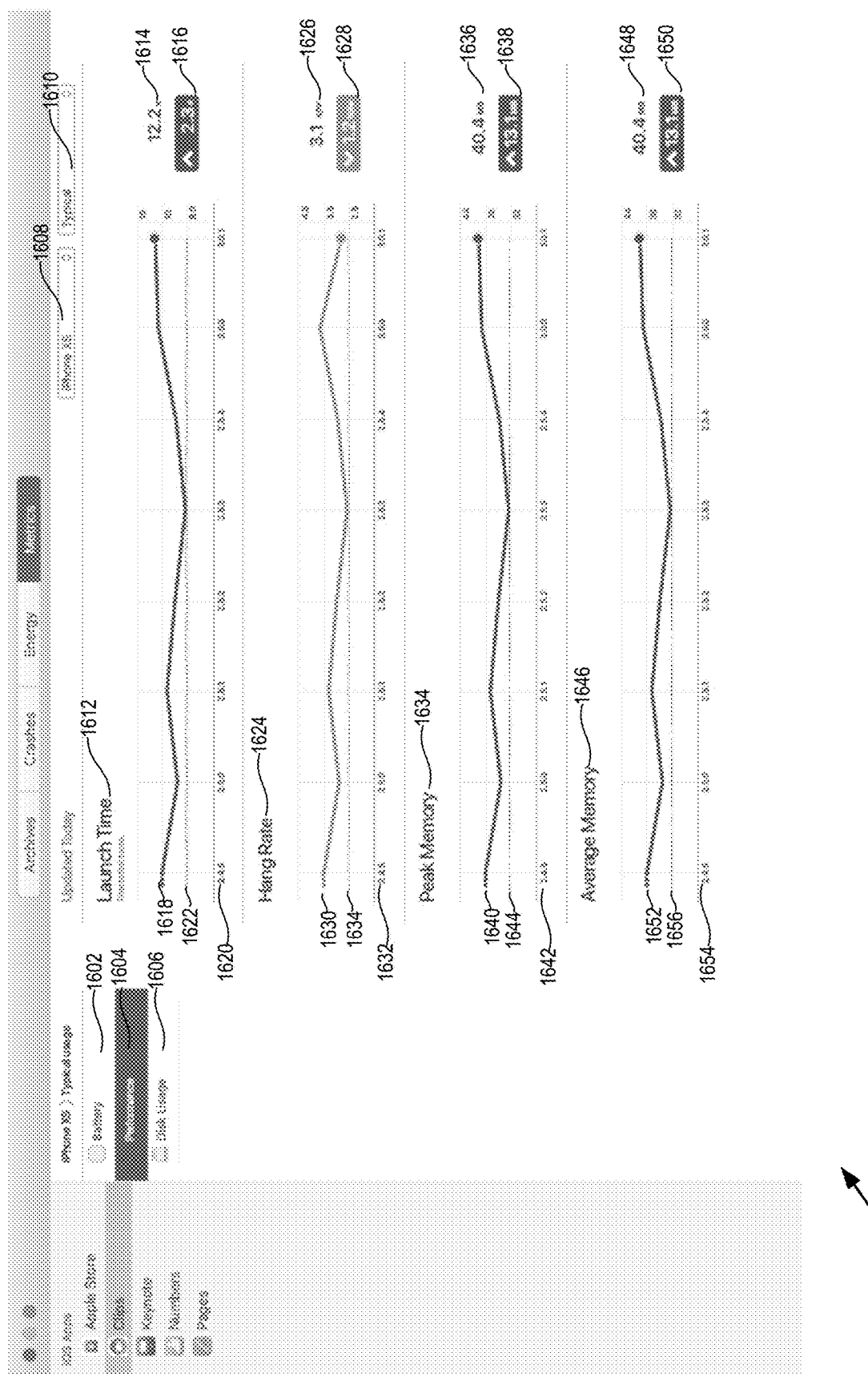
FIG. 16 illustrates an exemplary graphical user interface for displaying application performance metrics.

FIG. 16 illustrates an exemplary user interface 1600 for analyzing performance aspects for a third party application. In some embodiments, the user interface 1600 can allow for selection of power metrics 1602, performance metrics 1604, or disk usage metrics 1606. Performance metrics are displayed in FIG. 16.

In some embodiments, the exemplary user interface 1600 can depict the user selection for a class or model of a device 1608. For example, the data depicted in FIG. 16 is for the iPhone XS device. The user interface 1600 can depict the user selection for percentile 1610 of metrics.

The launch time histogram 1612 can be depicted on the user interface 1600. The launch time can be measured in seconds. The latest version launch time 1614 can be shown. The change in launch time 1616 from the previous version of the application can also be depicted. The launch time histogram 1618 can depict the launch time for each version 1620 of the application. The dotted line 1622 depicts best in class for launch time.

In some embodiments, the launch time can be measured from icon selection until display of a splash or introduction screen. In some embodiments, the launch time can be calculated until the application was responsive to user input. In still other embodiments, the developer can specify how launch time metrics will be calculated. Developers can be allowed to specify the end time.

The hang rate histogram 1624 can be depicted on the user interface 1600. The hang rate can be depicted in number of seconds that the application was unresponsive per hour of usage. The latest version hang rate 1626 can be shown. The change in hang rate 1628 from the previous version of the application can also be depicted. The launch time histogram 1630 can depict the launch time for each version 1632 of the application. The dotted line 1634 depicts best in class for hang rate.

The peak memory histogram 1634 can be depicted on the user interface 1600. The peak memory can be measured in megabytes. The latest version peak memory 1636 can be shown. The change in peak memory 1638 from the previous version of the application can also be depicted. The peak memory histogram 1640 can depict the launch time for each version 1642 of the application. The dotted line 1644 depicts best in class for peak memory.

The average memory histogram 1646 can be depicted on the user interface 1600. The average memory can be measured in megabytes. The latest version average memory 1648 can be shown. The change in average memory 1650 from the previous version of the application can also be depicted. The average memory histogram 1652 can depict the average memory for each version 1654 of the application. The dotted line 1656 depicts best in class for average memory.

C. Logical Writes Visualization User Interface

Figure 17:
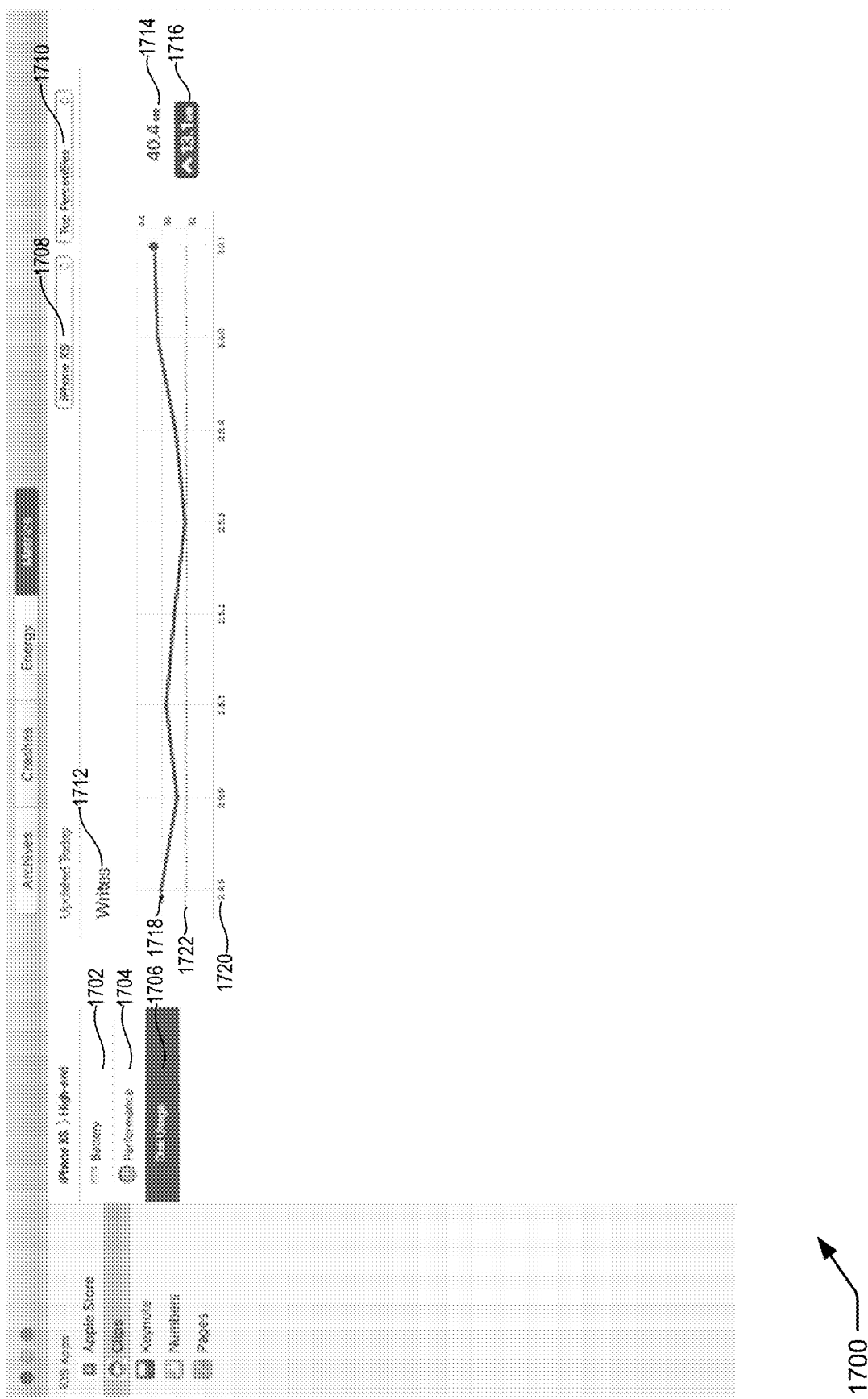
FIG. 17 illustrates an exemplary graphical user interface for logical writes to a solid state device.

FIG. 17 illustrates an exemplary user interface 1700 for analyzing performance aspects for a third party application. In some embodiments, the user interface 1700 can allow for selection of power metrics 1702, performance metrics 1704, or disk usage metrics 1706. Disc usage metrics are displayed in FIG. 17.

In some embodiments, the exemplary user interface 1700 can depict the user selection for a class or model of a device 1708. For example, the data depicted in FIG. 17 is for the iPhone XS device. The user interface 1700 can depict the user selection for percentile 1710 of metrics.

The logical writes histogram 1712 depicts the amount of logical writes written to the storage device over the last 24 hrs. The logical writes can be reported in megabytes. The latest version of logical writes 1714 can be depicted as well as the change in logical writes 1716 from the previous version of the application. The average memory histogram 1718 can depict the logical writes per day for each version 1720 of the application. The dotted line 1722 depicts best in class for logical writes.

V. Exemplary Devices

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 18:
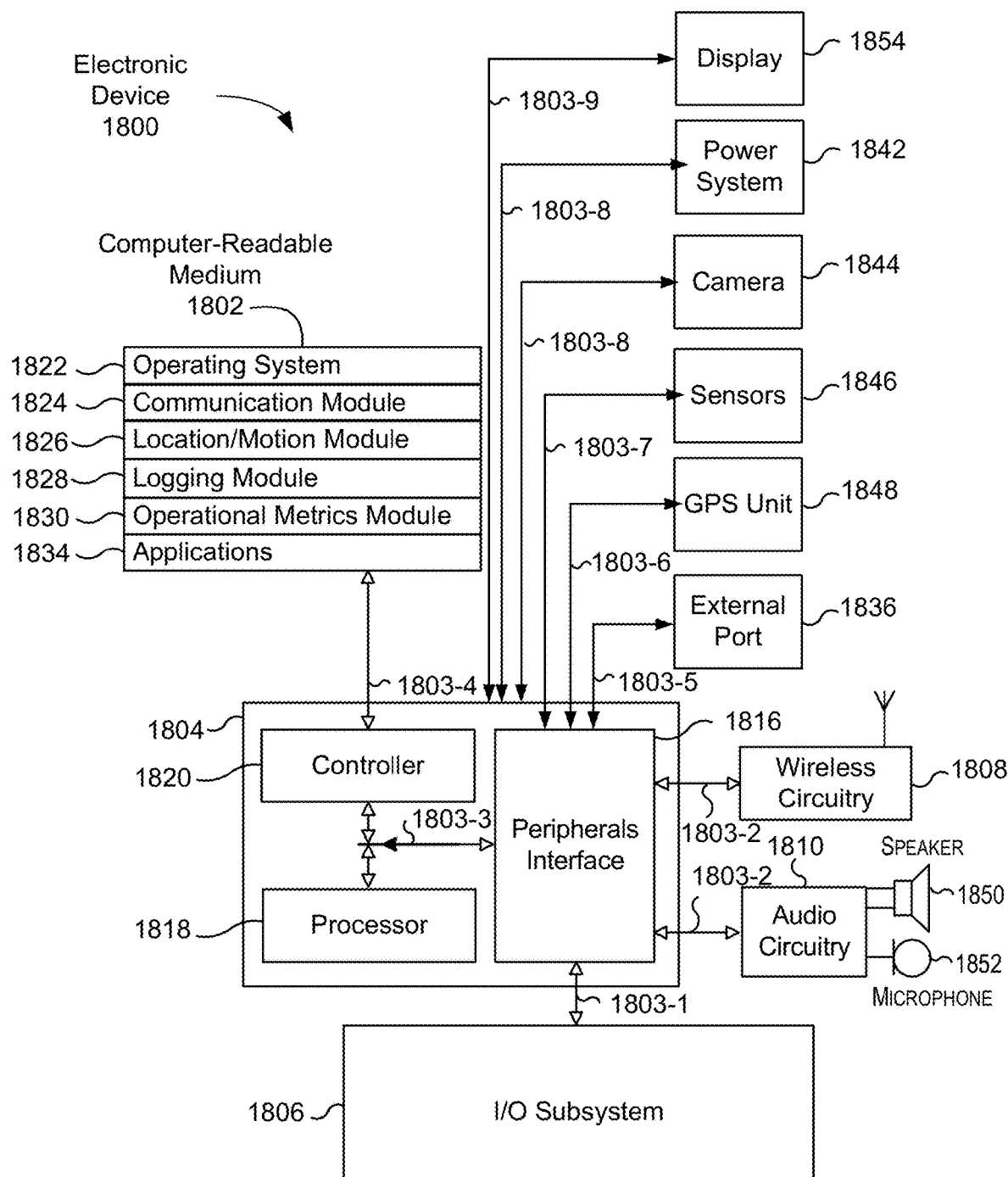
FIG. 18 illustrates a block diagram for an exemplary device to perform the one or more techniques described herein.

FIG. 18 is a block diagram of an exemplary device 1800, which may be a mobile device upon which the techniques can performed. Device 1800 generally includes computer-readable medium (memory) 1802, a processing system 1804, an Input/Output (I/O) subsystem 1806, wireless circuitry 1808, and audio circuitry 1810 including speaker 1850 and microphone 1852. These components may be coupled by one or more communication buses or signal lines 1803. Device 1800 can be any portable electronic device, including a handheld computer, a tablet computer, a mobile phone, laptop computer, tablet device, media player, a wearable device, personal digital assistant (PDA), a key fob, a car key, an access card, a multifunction device, a mobile phone, a portable gaming device, a car display unit, or the like, including a combination of two or more of these items.

The device 1800 can be a multifunction device having a display 1854. The display 1854 can be a touch screen in accordance with some embodiments. The touch screen optionally displays one or more graphics within user interface (UI). In some embodiments, a user is enabled to select one or more of the graphics by making a gesture on the graphics, for example, with one or more fingers or one or more styluses. In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 1800. In some implementations or circumstances, inadvertent contact with a graphic does not select the graphic. For example, a swipe gesture that sweeps over an application icon optionally does not select the corresponding application when the gesture corresponding to selection is a tap. Device 1800 can optionally also include one or more physical buttons, such as "home" or menu button. As menu button is, optionally, used to navigate to any application in a set of applications that are, optionally executed on the device 1800. Alternatively, in some embodiments, the menu button is implemented as a soft key in a graphical user interface displayed on touch screen.

The device 1800 can incorporate a display 1854. The display 1854 can be a liquid crystal display (LCD), organic light emitting diode (OLED), active matrix organic light emitting diode (AMOLED), Super active matrix light emitting diode (AMOLED), thin-film transistor (TFT), in-plane switching (IPS), or thin-film transistor liquid crystal display (TFT-LCD) that typically can be found a computing device. The display 1854 may be a touch screen display of a computing device.

In one embodiment, device 1800 includes touch screen, menu button, push button for powering the device on/off and locking the device, volume adjustment button(s), Subscriber Identity Module (SIM) card slot, head set jack, and docking/charging external port. Push button is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1800 also accepts verbal input for activation or deactivation of some functions through microphone. Device 1800 also, optionally, includes one or more contact intensity sensors for detecting intensity of contacts on touch screen and/or one or more tactile output generators for generating tactile outputs for a user of device 1800.

In one illustrative configuration, device 1800 may include at least one computer-readable medium (memory) 1802 and one or more processing units (or processor(s)) 1818. Processor(s) 1818 may be implemented as appropriate in hardware, software, or combinations thereof. Computer-executable instruction or firmware implementations of processor(s) 1818 may include computer-executable instructions written in any suitable programming language to perform the various functions described.

Computer-readable medium (memory) 1802 may store program instructions that are loadable and executable on processor(s) 1818, as well as data generated during the execution of these programs. Depending on the configuration and type of device 1800, memory 1802 may be volatile (such as random access memory (RAM)) and/or non-volatile (such as read-only memory (ROM), flash memory, etc.). Device 1800 can have one or more memories. Device 1800 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the devices. In some implementations, memory 1802 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

Memory 1802 and additional storage, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. Memory 1802 and additional storage are both examples of non-transitory computer storage media. Additional types of computer storage media that may be present in device 1800 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by device 1800. Combinations of any of the above should also be included within the scope of non-transitory computer-readable storage media. Based on the disclosure and teachings provided herein, a person of ordinary skill in the art can appreciate other ways and/or methods to implement the various embodiments. However, as noted above, computer-readable storage media does not include transitory media such as carrier waves or the like.

Alternatively, computer-readable communication media may include computer-readable instructions, program modules, or other data transmitted within a data signal, such as a carrier wave, or other transmission. However, as used herein, computer-readable storage media does not include computer-readable communication media.

Device 1800 may also contain communications connection(s) 1808 that allow device 1800 to communicate with a data store, another device or server, user terminals and/or other devices via one or more networks. Such networks may include any one or a combination of many different types of networks, such as cable networks, the Internet, wireless networks, cellular networks, satellite networks, other private and/or public networks, or any combination thereof. Device 1800 may also include I/O device(s) 1806, such as a touch input device, a keyboard, a mouse, a pen, a voice input device, a display, a speaker, a printer, etc.

It should be apparent that the architecture shown in FIG. 18 is only one example of an architecture for device 1800, and that device 1800 can have more or fewer components than shown, or a different configuration of components. The various components shown in FIG. 18 can be implemented in hardware, software, or a combination of both hardware and software, including one or more signal processing and/or application specific integrated circuits.

Wireless circuitry 1808 is used to send and receive information over a wireless link or network to one or more other devices' conventional circuitry such as an antenna system, a radio frequency (RF) transceiver, one or more amplifiers, a tuner, one or more oscillators, a digital signal processor, a codec chipset, memory, etc. Wireless circuitry 1808 can use various protocols, e.g., as described herein. For example, wireless circuitry 1808 can have one component for one wireless protocol (e.g., Bluetooth®) and a separate component for another wireless protocol (e.g., ultra-wide band ((UWB). Different antennas can be used for the different protocols.

Wireless circuitry 1808 is coupled to processing system 1804 via peripherals interface 1816. Interface 1816 can include conventional components for establishing and maintaining communication between peripherals and processing system 1804. Voice and data information received by wireless circuitry 1808 (e.g., in speech recognition or voice command applications) is sent to one or more processors 1818 via peripherals interface 1816. One or more processors 1818 are configurable to process various data formats for one or more application programs 1834 stored on computer-readable medium (memory) 1802.

Peripherals interface 1816 couple the input and output peripherals of the device to processor(s) 1818 and computer-readable medium 1802. One or more processors 1818 communicate with computer-readable medium 1802 via a controller 1820. Computer-readable medium 1802 can be any device or medium that can store code and/or data for use by one or more processors 1818. Medium 1802 can include a memory hierarchy, including cache, main memory and secondary memory.

Device 1800 also includes a power system 1842 for powering the various hardware components. Power system 1842 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1800 includes a camera 1844. In some embodiments, device 1800 includes sensors 1846. Sensors 1846 can include accelerometers, compasses, gyrometers, pressure sensors, audio sensors, light sensors, barometers, and the like. Sensors 1846 can be used to sense location aspects, such as auditory or light signatures of a location.

In some embodiments, device 1800 can include a GPS receiver, sometimes referred to as a GPS unit 1848. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1818 run various software components stored in medium 1802 to perform various functions for device 1800. In some embodiments, the software components include an operating system 1822, a communication module (or set of instructions) 1824, a location module (or set of instructions) 1826, a logging module 1828, an operational metrics module 1830, and other applications (or set of instructions) 1834.

Operating system 1822 can be any suitable operating system, including iOS, Macintosh Operating System (Mac OS), Darwin, Quadros Real-Time Operating System (RTXC), LINUX, UNIX, OS X, Microsoft Windows, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components. An operating system 1822 is system software that manages computer hardware and software resources and provides common services for computer programs. For example, the operating system 1822 can manage the interaction between the user interface module and one or more user application(s). The various embodiments further can be implemented in a wide variety of operating environments, which in some cases can include one or more user computers, devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Communication module 1824 facilitates communication with other devices over one or more external ports 1836 or via wireless circuitry 1808 and includes various software components for handling data received from wireless circuitry 1808 and/or external port 1836. External port 1836 (e.g., universal serial bus (USB), FireWire, Lightning connector, 60-pin connector, etc.) is adapted for coupling directly to other devices or indirectly over a network (e.g., the Internet, wireless local-area network (LAN), etc.).

Location/motion module 1826 can assist in determining the current position (e.g., coordinates or other geographic location identifiers) and motion of device 1800. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1826 receives data from GPS unit 1848 and analyzes the signals to determine the current position of the mobile device. In some embodiments, location/motion module 1826 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1808 and is passed to location/motion module 1826. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1800 based on the position coordinates of the corresponding transmitters. Regardless of the specific location technology used, location/motion module 1826 receives information from which a location fix can be derived, interprets that information, and returns location information, such as geographic coordinates, latitude/longitude, or other location fix data.

The electronic device can include a logging module 1828. The logging module 1828 once activated can receive and store event data that occurs on the electronic device. The event data can include but is not limited to central processing unit (CPU) time, graphics processing unit (GPU) time, memory information, launch time, hang time, average picture luminance (APL), frame rate, logical writes to a solid state device.

The electronic device can also include an operational metrics module 1830. The operational metrics module 1830 can receive the event data from the logging module and convert the event data into operational metrics. The metrics can include metadata indicating the operating system 1822 version number for the electronic device 1800, the class for the device 1800 and the model number for the device 1800.

The one or more applications programs 1834 on the mobile device can include any applications installed on the device 1800, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or advanced audio coding (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 1806 can be coupled to a display system (not shown), which can be a touch-sensitive display. The display system displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1806 can include a display and user input devices such as a keyboard, mouse, and/or track pad. In some embodiments, I/O subsystem 1806 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 1802) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as push-buttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1800 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art can appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Most embodiments utilize at least one network that would be familiar to those skilled in the art for supporting communications using any of a variety of commercially-available protocols, such as transmission control protocol/internet protocol (TCP/IP), open systems interconnection model (OSI), file transfer protocol (FTP), universal plug and play (UPnP), network file system (NFS), common internet file system (CIFS), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HyperText Transfer Protocol (HTTP) servers, file transfer protocol (FTP) servers, common gateway interface (CGI) servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically can include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other devices such as network input/output devices may be employed.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

As described above, one aspect of the present technology is the gathering and use of data available from various sources to display rectangular content in non-rectangular areas. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used display information regarding operation metrics for third party application. Accordingly, use of such personal information data can be presented to a user on the display. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of third party application evaluation techniques, the present technology can be configured to allow users to select to "opt in" or "opt out" of participation in the collection of personal information data during registration for services or anytime thereafter. In another example, users can select not to provide personal information to be displayed. In yet another example, users can select to limit amount of personal data is maintained or entirely prohibit the display of personal data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the third party application evaluation techniques, or publicly available information.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising performing, by an electronic device:
   receiving, at a metrics routine, an identifier to indicate execution of a third party application on the electronic device;
   determining, by the metrics routine, one or more operational metrics to be measured;
   identifying one or more logging routines for capturing one or more operational metrics, wherein a particular logging routine is identified to collect a particular metric;
   providing commands from the metrics routine to the one or more logging routines to initiate capturing event data associated with the one or more operational metrics;
   capturing, by the one or more logging routines, the event data during execution of the third party application via the one or more logging routines;
   saving, by the one or more logging routines, the event data to a persistent storage;
   upon trigger, using an aggregation routine to retrieve and aggregate the event data for the third party application to measure the one or more operational metrics; and
   transmitting the one or more operational metrics over a network to a database.

2. The method of claim 1, further comprising:
   determining central processing unit time as the one or more operational metrics to be measured;
   identifying a unix counter routine to collect central processing unit time, wherein a kernel aggregates central processing unit time for each process executing on the electronic device;
   aggregating by a logging routine the central processing unit time into discrete time intervals; and
   saving the aggregated central processing unit time to the persistent storage.

3. The method of claim 1, further comprising:
   determining graphics processing unit time as the one or more operational metrics to be measured;
   identifying a unix counter routine to collect graphics processing unit time, wherein a kernel aggregates graphics processing unit time for each process executing on the electronic device;
   aggregating by a logging routine the graphics processing unit time into discrete time intervals; and
   saving the aggregated graphics processing unit time to the persistent storage.

4. The method of claim 1, further comprising:
   determining cellular condition time as the one or more operational metrics to be measured, wherein the cellular condition time measures an elapsed time that the electronic device spends in one of a plurality of defined cellular conditions, wherein the defined cellular conditions comprise a type of network connection and network properties;
   identifying a cellular monitoring routine, wherein baseband firmware provides event based updates on current cellular condition for the electronic device;

aggregating by a logging routine the cellular condition time per process; and
saving the aggregated cellular condition time to the persistent storage.
5. The method of claim 1, further comprising:
determining an application mode time as the one or more operational metrics to be measured;
identifying an application mode detection routine, wherein the application mode detection routine determines whether the third party application is running in a foreground or in a background;
aggregating by a logging routine the application mode time per application; and
saving the aggregated application mode time to the persistent storage.
6. The method of claim 1, further comprising:
determining location acquisition time as the one or more operational metrics to be measured;
identifying a location acquisition routine, wherein the location acquisition routine measures time acquiring location for different accuracy levels;
aggregating by a logging routine an elapsed time acquiring location by accuracy levels; and
saving the aggregated location acquisition time to the persistent storage.
7. The method of claim 1, further comprising:
determining average pixel luminance as the one or more operational metrics to be measured;
identifying an pixel luminance detection routine, wherein the pixel luminance detection routine measures an average of pixel luminance for a display of the electronic device;
aggregating by a logging routine the average pixel luminance by application; and
saving the aggregated average pixel luminance to the persistent storage.
8. The method of claim 1, further comprising:
determining network transfer bytes as the one or more operational metrics to be measured;
identifying a data transfer routine, wherein the data transfer routine measures data transfer over a network;
aggregating by a logging routine the network transfer bytes by application; and
saving the aggregated network transfer bytes to the persistent storage.
9. The method of claim 1, further comprising:
determining memory consumption data as the one or more operational metrics to be measured;
identifying a memory usage routine, wherein the memory usage routine measures peak and average memory consumption by the third party application;
aggregating by a logging routine the memory consumption data by application; and
saving the memory consumption data to the persistent storage.
10. The method of claim 1, further comprising:
determining application response time as the one or more operational metrics to be measured;
identifying a hangtracer routine to measure minutes of unresponsive time of the third party application;
aggregating by a logging routine the application response time by application; and
saving the aggregated application response time to the persistent storage.
11. The method of claim 1, further comprising:
determining application launch time as the one or more operational metrics to be measured;
identifying a launch time routine, wherein the launch time routine measures an elapsed time between receiving a selection of an application icon and drawing a first visible pixel on a display of the electronic device;
aggregating by a logging routine application launch time by application; and
saving the application launch time to the persistent storage.
12. The method of claim 1, further comprising:
determining a number of logical writes as the one or more operational metrics to be measured;
identifying storage monitoring routine, wherein the storage monitoring routine measures the number of logical writes of a storage device of the electronic device;
aggregating by a logging routine application the number of logical writes into discrete time intervals; and
saving the number of logical writes to the persistent storage.
13. The method of claim 1, further comprising:
executing an application programming interface on the electronic device, the application programming interface provides for a customized interval for the one or more logging routines;
saving a start marker and an end marker in a log storage on the electronic device; and
capturing one or more operational metrics between the start marker and the end marker.
14. A computing device, comprising:
one or more memories; and
one or more processors in communication with the one or more memories and configured to execute instructions stored in the one or more memories for performing operations comprising:
receiving, at a metrics routine, an identifier to indicate execution of a third party application on the computing device;
determining, by the metrics routine, one or more operational metrics to be measured;
identifying one or more logging routines for capturing one or more operational metrics, wherein a particular logging routine is identified to collect a particular metric;
providing commands from the metrics routine to the one or more logging routines to initiate capturing event data associated with the one or more operational metrics;
capturing, by the one or more logging routines, the event data during execution of the third party application via the one or more logging routines;
saving, by the one or more logging routines, the event data to a persistent storage;
upon trigger, using an aggregation routine to retrieve and aggregate the event data for the third party application to measure the one or more operational metrics; and
transmitting the one or more operational metrics over a network to a database.
15. The computing device of claim 14, wherein the instructions stored in the one or more memories for performing the operations further comprising:
determining central processing unit time as the one or more operational metrics to be measured;
identifying a unix counter routine to collect central processing unit time, wherein a kernel aggregates central processing unit time for each process executing on the computing device;

aggregating by a logging routine the central processing unit time into discrete time intervals; and saving the aggregated central processing unit time to the persistent storage.

16. The computing device of claim 14, wherein the instructions stored in the one or more memories for performing the operations further comprising:

determining graphics processing unit time as the one or more operational metrics to be measured;

identifying a unix counter routine to collect graphics processing unit time, wherein a kernel aggregates graphics processing unit time for each process executing on the computing device;

aggregating by a logging routine the graphics processing unit time into discrete time intervals; and saving the aggregated graphics processing unit time to the persistent storage.

17. A non-transitory computer-readable medium storing a plurality of instructions that, when executed by one or more processors of a computing device, cause one or more processors to perform operations comprising:

receiving, at a metrics routine, an identifier to indicate execution of a third party application on the computing device;

determining, by the metrics routine, one or more operational metrics to be measured;

identifying one or more logging routines for capturing one or more operational metrics, wherein a particular logging routine is identified to collect a particular metric;

providing commands from the metrics routine to the one or more logging routines to initiate capturing event data as with the one or more operational metrics;

capturing, by the one or more logging routines, the event data during execution of the third party application via the one or more logging routines, saving, by the one or more logging routines, the event data to a persistent storage;

upon trigger, using an aggregation routine to retrieve and aggregate the event data for the third party application to measure the one or more operational metrics; and transmitting the one or more operational metrics over a network to a database.

18. The computer-readable medium of claim 17, storing the plurality of instructions that, when executed by the one or more processors of the computing device, cause the one or more processors to perform operations further comprising:

determining cellular condition time as the one or more operational metrics to be measured, wherein the cellular condition time measures an elapsed time that the computing device spends in one of a plurality of defined cellular conditions, wherein the defined cellular conditions comprise a type of network connection and network properties;

identifying a cellular monitoring routine, wherein baseband firmware provides event based updates on current cellular condition for the computing device;

aggregating by a logging routine the cellular condition time per process; and saving the aggregated cellular condition time to the persistent storage.

19. The computer-readable medium of claim 17, storing the plurality of instructions that, when executed by the one or more processors of the computing device, cause the one or more processors to perform operations further comprising:

determining an application mode time as the one or more operational metrics to be measured;

identifying an application mode detection routine, wherein the application mode detection routine determines whether the third party application is running in a foreground or in a background;

aggregating by a logging routine the application mode time per application; and saving the aggregated application mode time to the persistent storage.

20. The computer-readable medium of claim 17, storing the plurality of instructions that, when executed by the one or more processors of the computing device, cause the one or more processors to perform operations further comprising:

determining location acquisition time as the one or more operational metrics to be measured;

identifying a location acquisition routine, wherein the location acquisition routine measures time acquiring location for different accuracy levels;

aggregating by a logging routine an elapsed time acquiring location by accuracy levels; and saving the aggregated location acquisition time to the persistent storage.

* * * * *

UNITED STATES PATENT AND TRADEMARK OFFICE
CERTIFICATE OF CORRECTION

| | |
|---|---|
| PATENT NO. | : 11,036,610 B2 |
| APPLICATION NO. | : 16/671093 |
| DATED | : June 15, 2021 |
| INVENTOR(S) | : Amit K. Vyas et al. |

Page 1 of 1

It is certified that error appears in the above-identified patent and that said Letters Patent is hereby corrected as shown below:

In the Claims

Column 49, Line 34: In Claim 17, please replace "as" with --associated--

Signed and Sealed this
Third Day of August, 2021

Drew Hirshfeld
*Performing the Functions and Duties of the
Under Secretary of Commerce for Intellectual Property and
Director of the United States Patent and Trademark Office*